United States Patent [19]
Sato et al.

[11] Patent Number: 5,947,576
[45] Date of Patent: Sep. 7, 1999

[54] OBLIQUE PROJECTION OPTICAL APPARATUS

[75] Inventors: Akira Sato, Shiga-ken; Katsuhiro Takamoto, Sakai, both of Japan

[73] Assignee: Minolta Co., Ltd., Osaka, Japan

[21] Appl. No.: 08/943,720

[22] Filed: Oct. 3, 1997

[30] Foreign Application Priority Data

Oct. 3, 1996 [JP] Japan ........................... 8-262939
Dec. 27, 1996 [JP] Japan ........................... 8-350459

[51] Int. Cl.⁶ ........................................ G03B 21/14
[52] U.S. Cl. ................................... 353/70; 353/69
[58] Field of Search ........................ 353/69, 70, 101, 353/100, 122

[56] References Cited

U.S. PATENT DOCUMENTS

| | | | |
|---|---|---|---|
| 3,963,337 | 6/1976 | Lundberg | 353/70 |
| 5,096,288 | 3/1992 | Yano et al. | 353/69 |
| 5,302,983 | 4/1994 | Sato et al. | 353/69 |
| 5,355,188 | 10/1994 | Biles et al. | 353/69 |
| 5,422,691 | 6/1995 | Ninomiya et al. | 353/69 |
| 5,442,413 | 8/1995 | Tejima et al. | 353/69 |
| 5,477,394 | 12/1995 | Shibazaki | 359/858 |
| 5,709,445 | 1/1998 | Takamoto | 353/69 |
| 5,716,118 | 2/1998 | Sato et al. | 353/69 |
| 5,730,517 | 3/1998 | Berglund | 353/70 |
| 5,820,240 | 10/1998 | Ohzawa | 353/70 |

FOREIGN PATENT DOCUMENTS

| | | |
|---|---|---|
| 61-018172 | 5/1986 | Japan . |
| 4-044022 | 2/1992 | Japan . |
| 4-056297 | 9/1992 | Japan . |
| 5-241096 | 9/1993 | Japan . |

*Primary Examiner*—William Dowling
*Attorney, Agent, or Firm*—Sidley & Austin

[57] ABSTRACT

A projection optical apparatus has a projection optical system for projecting from a primary image an enlarged or reduced secondary image. A line connecting a center of an aperture diaphragm of the projection optical system to a center of an enlargement-side image plane forms a predetermined angle with respect to a normal to the enlargement-side image plane. The enlargement-side image plane and a reduction-side image plane are approximately parallel to each other. The projection optical system provides, on its enlargement side, curvature of field that is convex toward the projection optical system.

13 Claims, 23 Drawing Sheets

OBLIQUE PROJECTION OPTICAL APPARATUS

FIELD OF THE INVENTION

The present invention relates to an enlarging projection optical apparatus such as an overhead projector or a liquid crystal projector, and is applicable also to a reducing projection optical apparatus such as an image scanner.

BACKGROUND OF THE INVENTION

Overhead projectors (hereinafter also referred to as OHPs) are widely used in conferences and seminars to visually present charts, graphs, and the like to the audience concurrently with oral explanations. An OHP projects enlarged images onto a screen from a transparent original such as a transparency or a liquid crystal panel. To achieve this, an OHP is provided with a projection lens for projecting images onto a screen from a transparent original, and a reflection mirror for reflecting the light from a light source toward the screen. Inconveniently, however, these components are usually arranged above the body of the OHP by the use of support members, and thus they often obstruct part of the view of the images projected onto the screen.

Moreover, in conventional projection apparatuses including liquid crystal projectors, images are usually projected from a direction perpendicular to the screen onto the front surface of the screen by the projection apparatus. As a result, conventional projection apparatuses partially obstruct the projected images. On the other hand, a projector of a backward projection type that is placed behind the screen is designed to receive the light from an image from its side and reflect the light onto the back surface of the screen. As a result, projectors of this type suffer from their relatively large sizes required to allow the reflection mirror to be inclined within a sufficiently wide range of angles.

To overcome this inconvenience, various attempts have been made. For example, in the case of an OHP, as shown in FIG. 1, it is possible to prevent obstruction of the sight of observers 13 by projecting images obliquely from the OHP 11 onto the screen 3. In FIG. 1, numeral 12 represents the operator of the OHP 11. In this way, as shown in FIG. 2, in a case where the width of the screen 3 is 1.2 m and the distance from the OHP 11 to the screen 3 is 1.5 m, it is possible to observe projected images without substantial obstruction even from behind the OHP 11 by setting the projection angle α to 20°. Here, the projection angle α refers to the angle formed by the line connecting the center of the projection lens of the OHP 11 to the center of the screen 3 with respect to a normal to the screen 3, as observed on the plane including the line and the normal.

Alternatively, as shown in FIG. 3, it is possible to project images obliquely upward with a projection angle θ by use of a similar optical system. Alternatively, as shown in FIG. 4, it is possible even to realize a low-profile projector of a backward projection type by an effective use of an optical system designed for oblique projection. In FIG. 4, numeral 1 represents a member serving as an original such as a liquid crystal panel, and numeral 7 represents a projection lens unit.

To make it possible to project images obliquely onto the surface of a screen without substantial distortion as described above, various inventions have been made. For example, Japanese Published Patent No. H4-56297 proposes using a means for movably supporting a lens and a means for movably supporting an original stand to allow the lens and the original stand to be inclined at desired angles so that images can be projected without substantial distortion. On the other hand, Japanese Laid-open Patent Application No. H5-241096 proposes arranging the surface of a screen at an angle with respect to a projection lens and in addition, to correct the resulting trapezoid distortion, arranging part of the projection lens at an angle.

However, the construction proposed in Japanese Published Patent No. H4-56297 requires a large-aperture wide-angle projection lens to obtain projection angles larger than 20°, and thus requires extra cost. In addition, as shown in FIG. 5, with such large projection angles, this construction exhibits markedly asymmetrical distribution of projected light with respect to the center of the image plane on the screen 3, because it has its aperture diaphragm 8 arranged perpendicularly to the optical axis of the projection lens unit 7.

Moreover, in an ordinary optical system, a change in the projection distance is coped with by adjusting focus, that is, by moving the projection lens along the optical axis, but, in an oblique projection optical system, as shown in FIG. 6, moving the projection lens unit 7 and the aperture diaphragm 8 from their positions as originally designed along the optical axis as indicated by the arrow H results in eclipse in that part of the light from the light source 6 which enters the optical system from oblique directions; specifically, the part of the light that is expected to pass through the hatched region B is eclipsed, and thus this optical system suffers from heavy loss and uneven distribution of light. In FIG. 6, numeral 5 represents a condenser lens for condensing the light from the light source 6.

On the other hand, the construction proposed in Japanese Laid-open Patent Application No. H5-241096 is difficult to adapt to large projection angles, because inclining part of the projection lens leads to a serious degradation in its optical performance.

SUMMARY OF THE INVENTION

An object of the present invention is to provide an oblique projection optical apparatus that provides satisfactory images even when images are projected with large projection angles and that achieves it by the use of a relatively small-sized and low-cost projection lens.

Another object of the present invention is, in an oblique projection optical apparatus, to properly correct asymmetrical distribution of the brightness of projected images with respect to the center of the screen surface, as well as asymmetrical distribution of the brightness due to eclipse caused in the light from the light source as a result of focusing.

To achieve the above objects, according to one aspect of the present invention, a projection optical apparatus including a projection optical system for projecting from a primary image an enlarged or reduced secondary image is characterized in that a line connecting a center of an aperture diaphragm of the projection optical system to a center of an enlargement-side image plane forms a predetermined angle with respect to a normal to the enlargement-side image plane, in that the enlargement-side image plane and a reduction-side image plane are approximately parallel to each other, and in that the projection optical system provides, on its enlargement side, curvature of field that is convex toward the projection optical system.

According to another aspect of the present invention, a projection optical apparatus including a projection optical system for projecting from a primary image an enlarged or reduced secondary image is characterized in that a line connecting a center of an aperture diaphragm of the projection optical system to a center of an enlargement-side image plane forms a predetermined angle with respect to a normal to the enlargement-side image plane, in that the enlargement-side image plane and a reduction-side image plane are approximately parallel to each other, and in that the following conditions (1) and (2) are satisfied:

$$20 \leq \theta < 90 \tag{1}$$

$$\sum_i \left\{ \left(\frac{1}{ri}\right)\left(\frac{1}{ni} - \frac{1}{n'i}\right) \right\} > \frac{0.25}{L} \tag{2}$$

where

θ represents the angle (in degrees) formed by the line connecting the center of the aperture diaphragm of the projection lens system to the center of the enlargement-side image plane with respect to a normal to the enlargement-side image plane, ri represents the radius of curvature of the i-th refractive surface included in the projection lens system, ni represents the refractive index of the medium that exists on the object side of the i-th refractive surface included in the projection lens system, n'i represents the refractive index of the medium that exists on the image side of the i-th refractive surface included in the projection lens system, and L represents the distance between the center of the enlargement-side image plane and the center of the aperture diaphragm of the projection lens system.

According to still another aspect of the present invention, a projection optical apparatus including a projection optical system for projecting from a primary image an enlarged or reduced secondary image is characterized in that a line connecting a center of an aperture diaphragm of the projection optical system to a center of an enlargement-side image plane forms a predetermined angle with respect to a normal to the enlargement-side image plane, in that the enlargement-side image plane and a reduction-side image plane are approximately parallel to each other, and in that the projection optical system is composed of at least two centered lens units that are arranged decentered from one another.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, embodiments of the present invention will be described with reference to the drawings.

Figure 1:
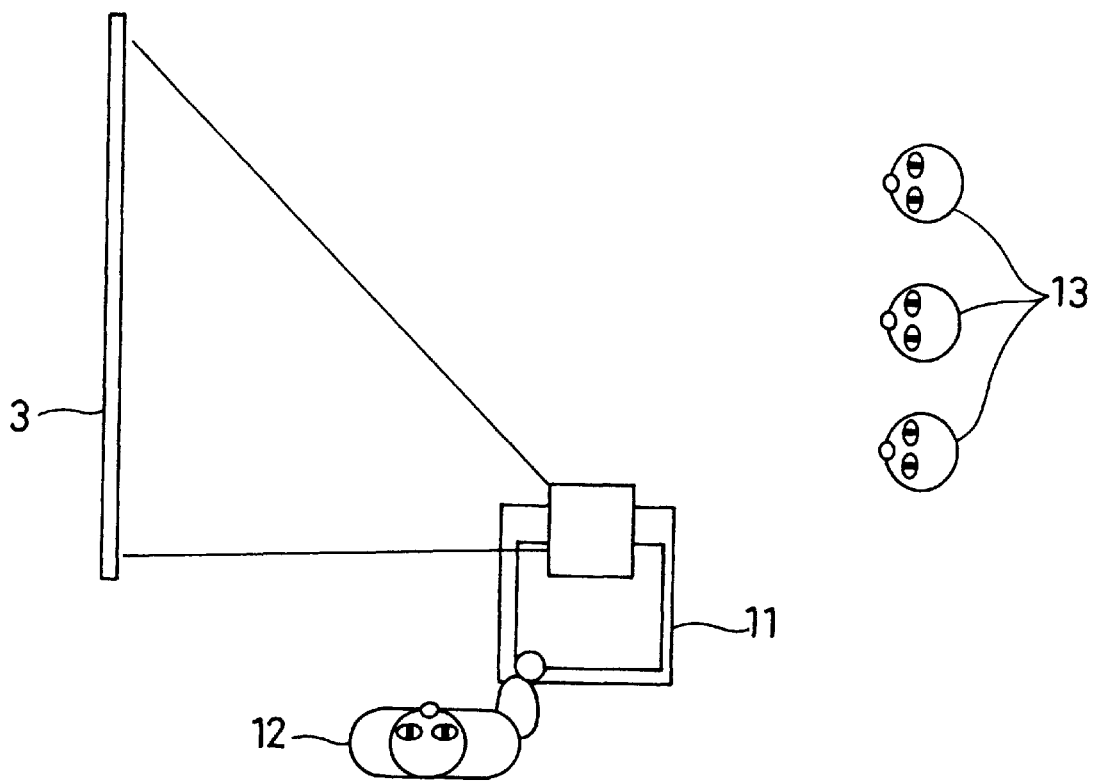
FIG. 1 is a diagram illustrating an image being projected obliquely from an OHP.
Figure 2:
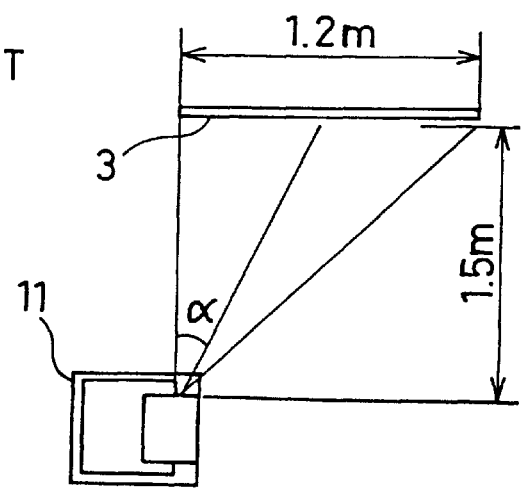
FIG. 2 is a diagram illustrating the angle conditions to be satisfied in an oblique projection of an image.
Figure 3:
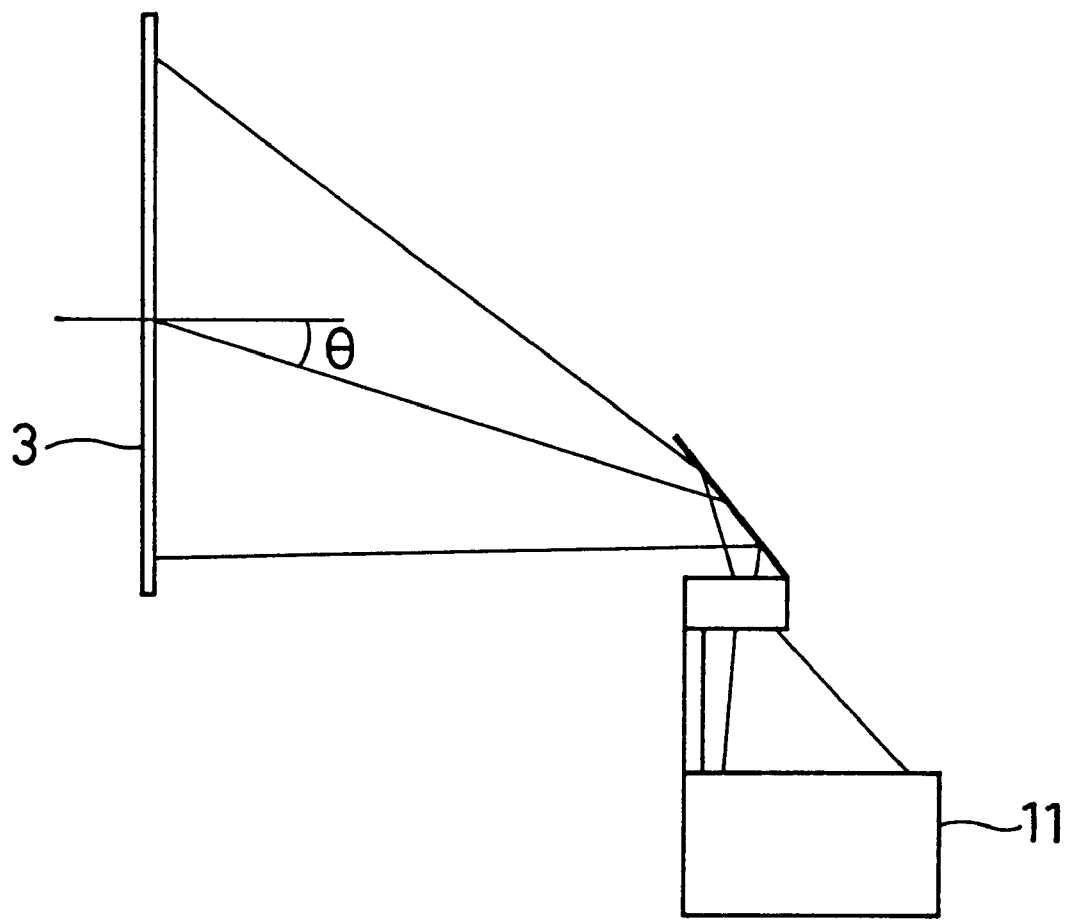
FIG. 3 is a diagram illustrating an image being is projected obliquely upward.
Figure 4:
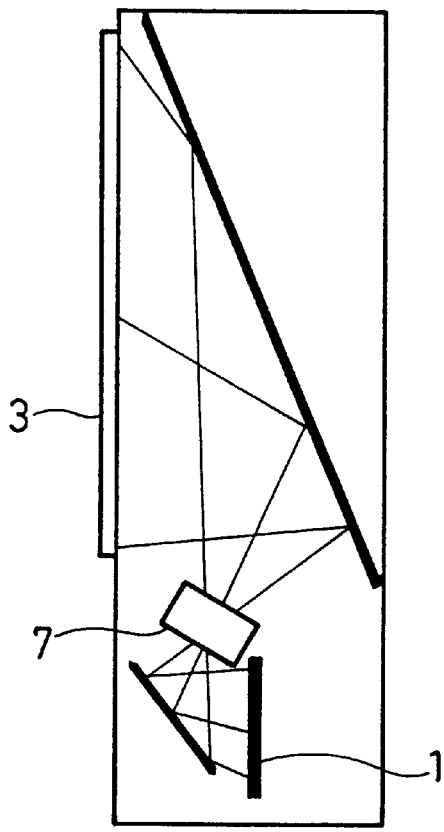
FIG. 4 is a diagram showing the construction of a low-profile projector of a backward projection type.
Figure 5:
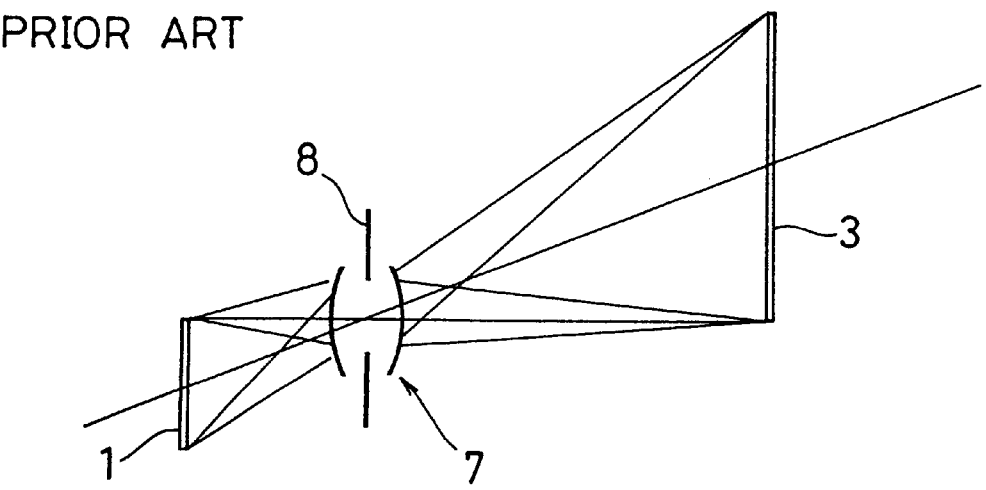
FIG. 5 is a diagram illustrating an uneven distribution of light caused by an aperture diaphragm arranged perpendicularly to the optical axis.
Figure 6:
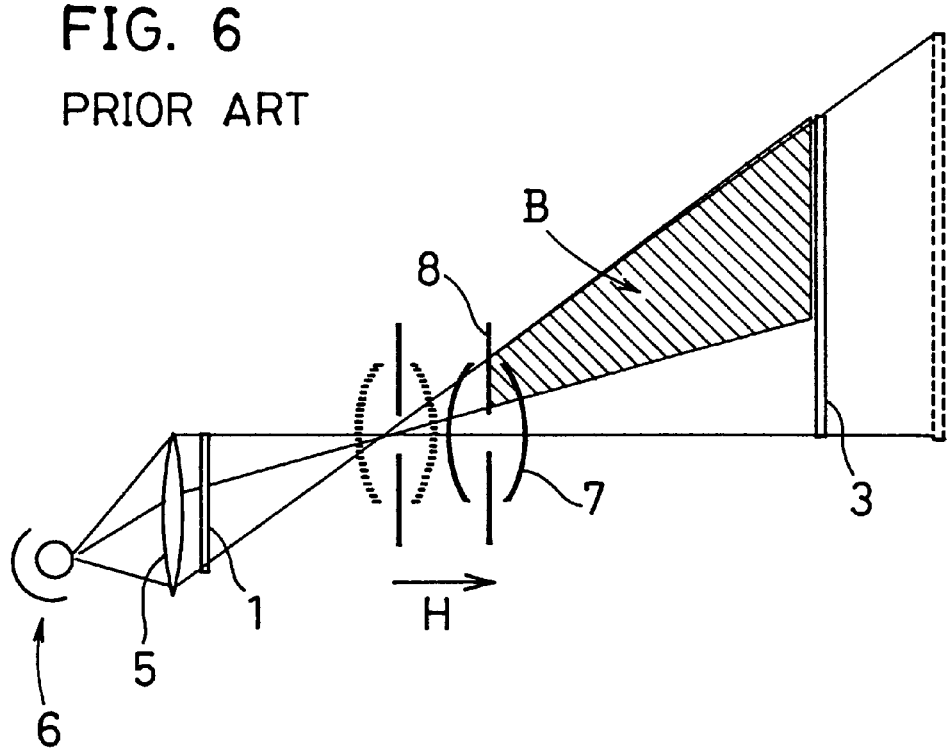
FIG. 6 is a diagram illustrating an eclipse of light caused by the movement of a projection lens unit.
Figure 7:
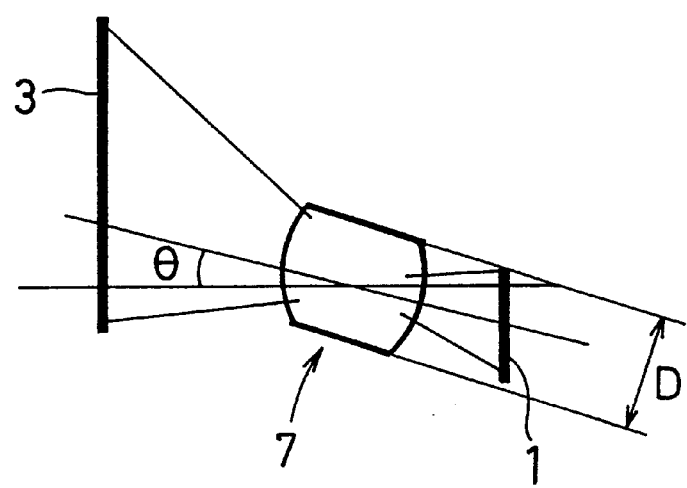
FIG. 7 is a diagram illustrating a compact projection lens unit.

As shown in FIG. 5, in an oblique projection optical system, the surface of an original-providing member 1 and the surface of a screen 3 are typically arranged approximately parallel to each other to prevent trapezoid distortion. In addition, according to the present invention, as shown in FIG. 7, a projection lens unit 7 is arranged with an inclination θ with respect to the original-providing member 1 and the screen 3 so that the aperture diameter D of the projection lens unit 7 can be reduced.

Figure 8:
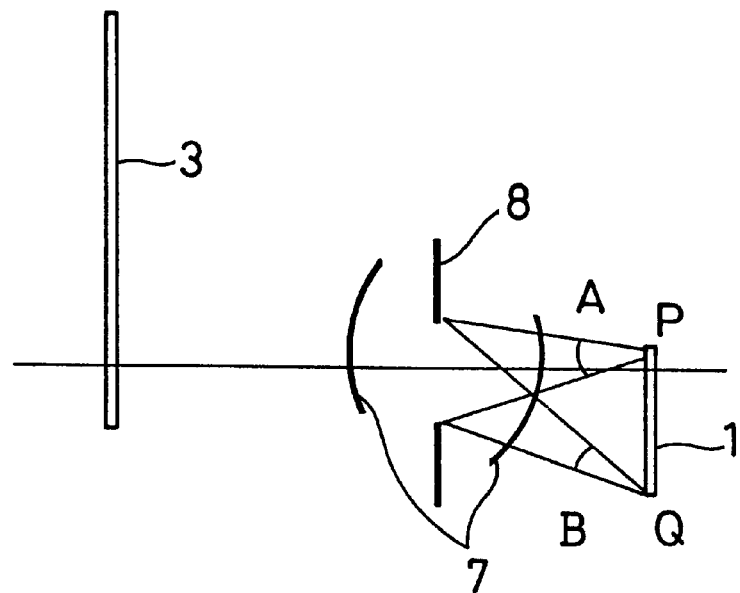
FIG. 8 is a diagram showing an optical system in which the aperture diaphragm is arranged parallel to the original-providing member.
Figure 9:
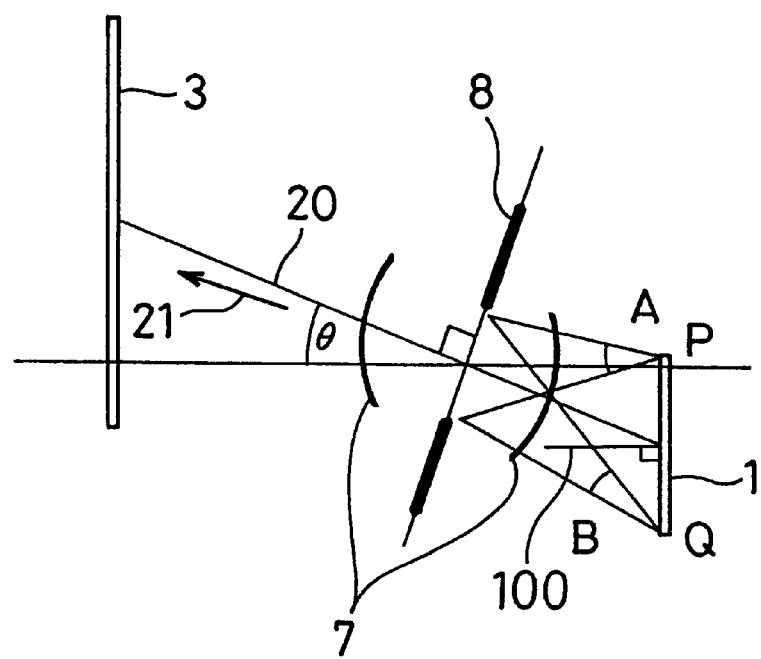
FIG. 9 is a diagram showing an optical system in which the aperture diaphragm is arranged with an inclination with respect to the original-providing member.

Moreover, as shown in FIG. 8, if an aperture diaphragm 8 is arranged parallel to the original-providing member 1, the rays entering the aperture diaphragm 8 from points P and Q at the top and bottom edges of the original-providing member 1 cover different angles A and B, respectively. As a result, in the image projected onto the screen 3, the part formed by the rays from point P is brighter than the part formed by the rays from point Q. This uneven distribution of brightness over the surface of the screen 3 can be corrected by increasing the amount of light that enters the aperture diaphragm 8 from point Q, and this is achieved, as shown in FIG. 9, by tilting the aperture diaphragm 8 to have a normal 21 (i.e. a direction perpendicular to the plane of the aperture diaphragm) that is inclined, with respect to a line 100 normal to the original-providing member 1, toward the direction of the line 20 connecting the center of the aperture diaphragm 8 to the center of the original-providing member 1.

Here, note that, as the aperture diaphragm 8 is inclined more and more in an attempt to make the above angles A and B equal, light beams passing through the peripheral portion of the optical system become thicker and thicker. Since, in general, it is difficult to obtain imaging performance as designed at the periphery of an optical system, it is not practical to make the angles A and B exactly equal. Accordingly, it is advisable to arrange the aperture diaphragm 8 with such an inclination that allows the line connecting the center of the aperture diaphragm 8 to the center of the original-providing member 1 to cross the plane of the aperture diaphragm 8 at an angle close to a right angle.

Figure 10:
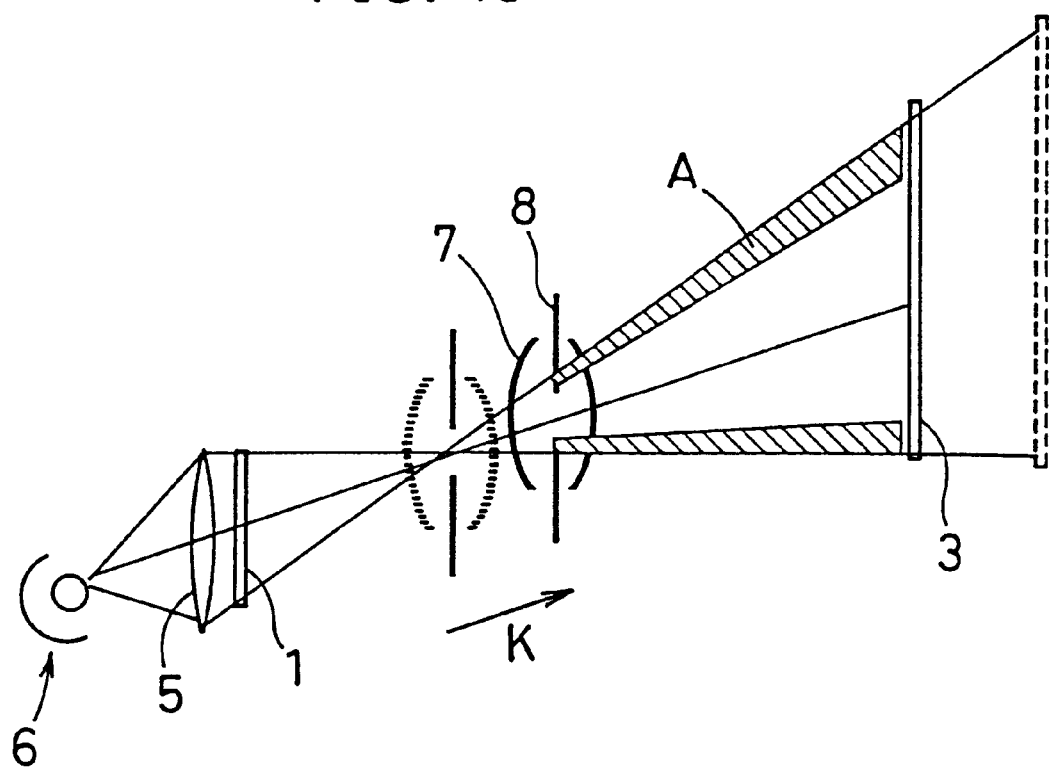
FIG. 10 is a diagram illustrating the principle of focusing performed in the oblique projection optical apparatus of a first embodiment of the invention.

Furthermore, as shown in FIG. 10, by moving the aperture diaphragm 8 and the projection lens unit 7 as one unit along the line connecting the center of the aperture diaphragm 8 and the center of the original-providing member 1 as indicated by the arrow K, it is possible to reduce the hatched region A in which light does not arrive due to eclipse, and thus it is possible to realize an oblique projection optical apparatus in which loss and uneven distribution of light are minimized.

Figure 11:
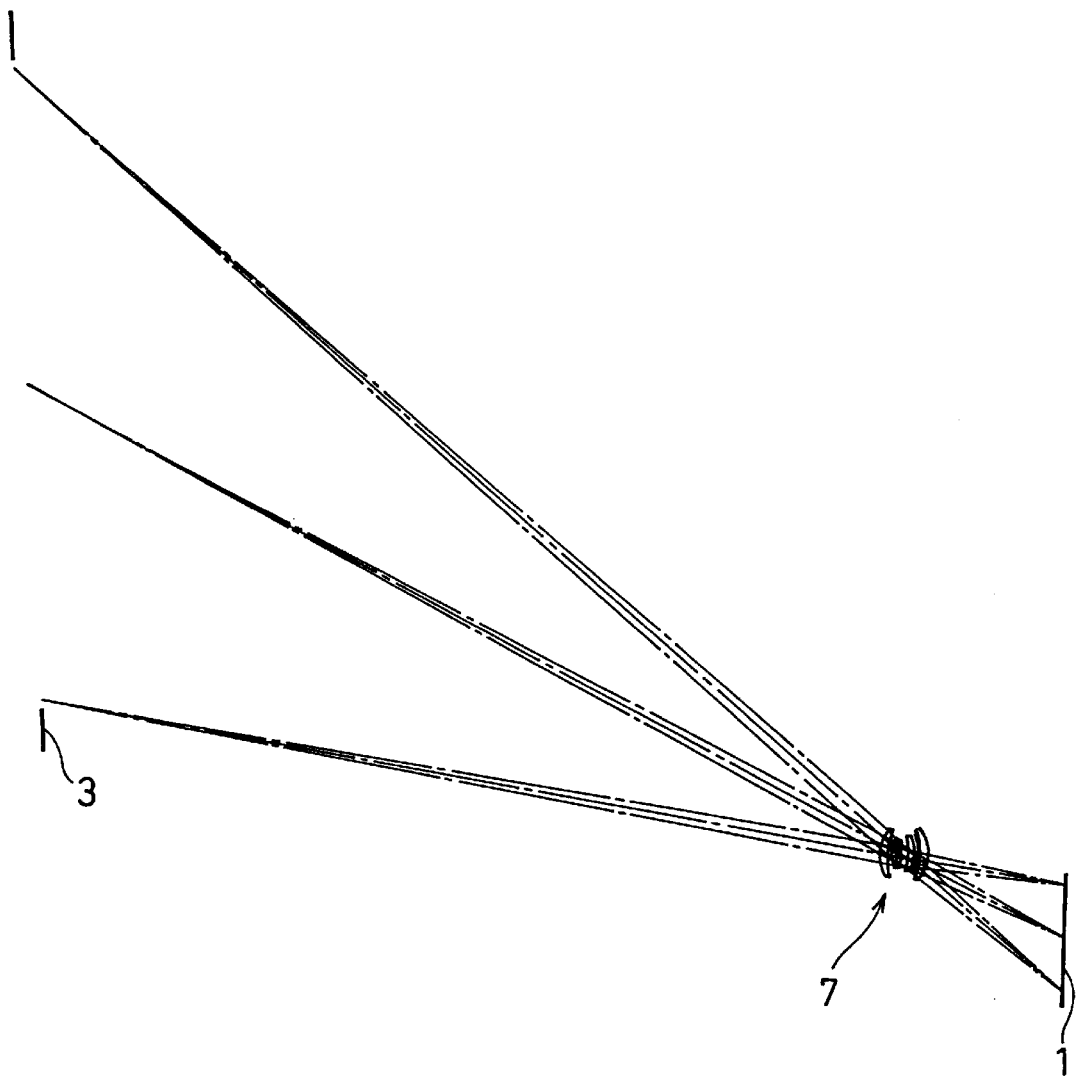
FIG. 11 is a diagram showing the construction of the optical system used in the first embodiment.
Figure 12:
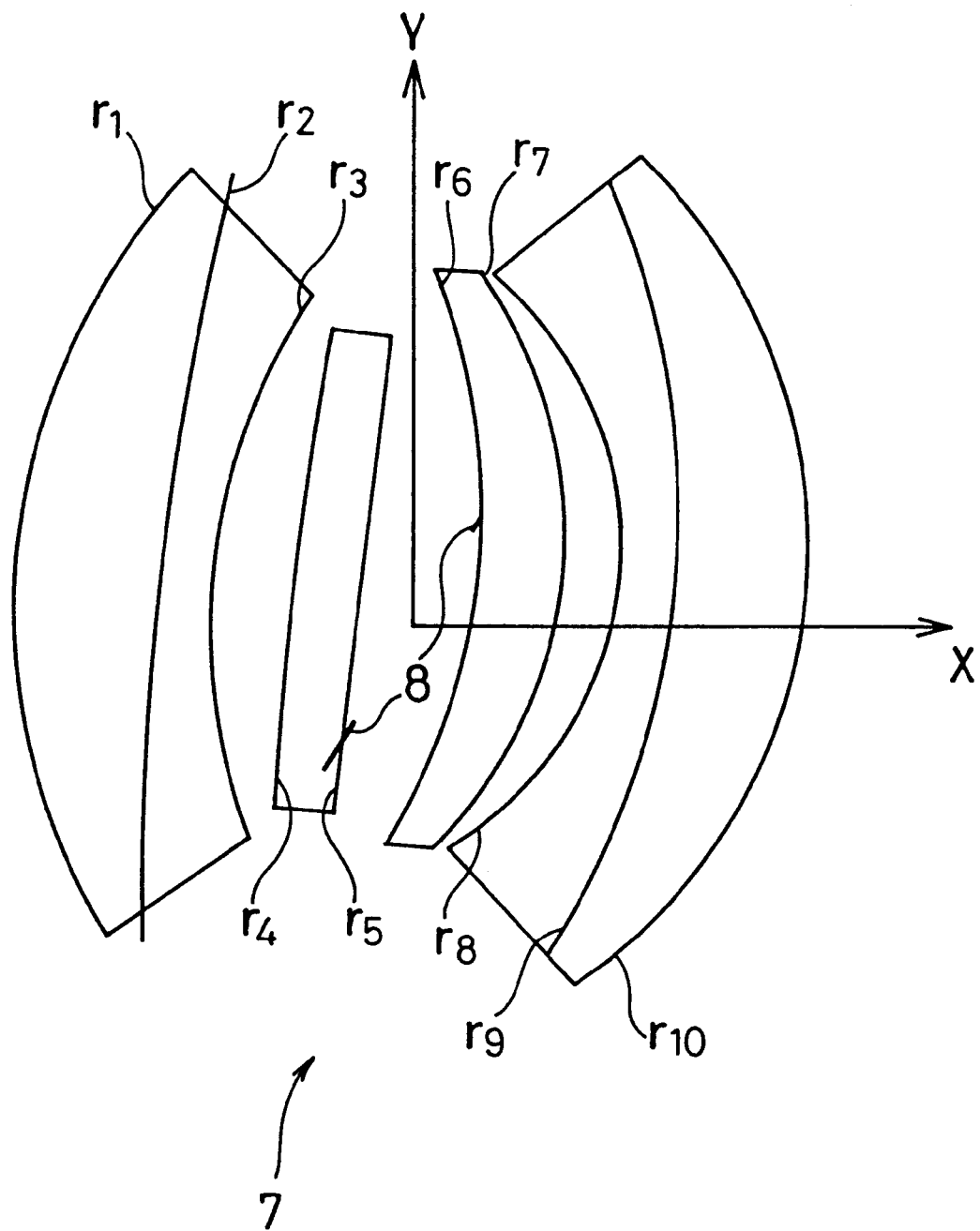
FIG. 12 is a diagram showing the construction of the projection lens unit used in the first embodiment.
Figure 13A:
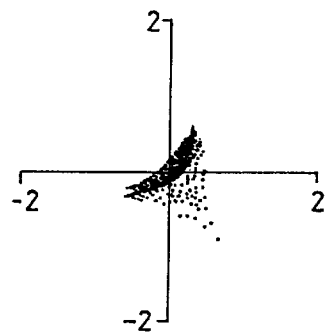
FIGS. 13A to 13I are spot diagrams of the optical system of the first embodiment.
Figure 13B:
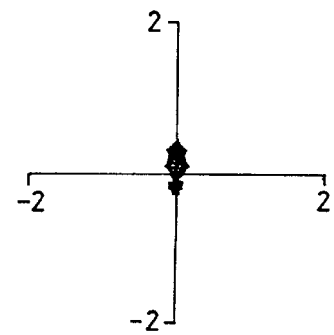
Figure 13C:
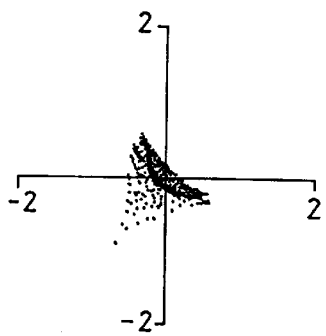
Figure 13D:
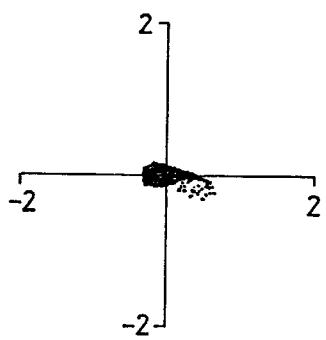
Figure 13E:
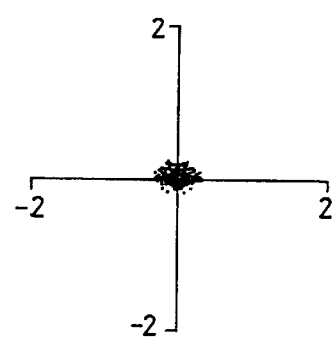
Figure 13F:
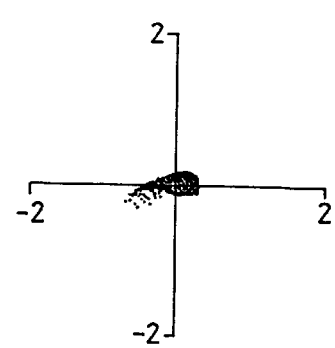
Figure 13G:
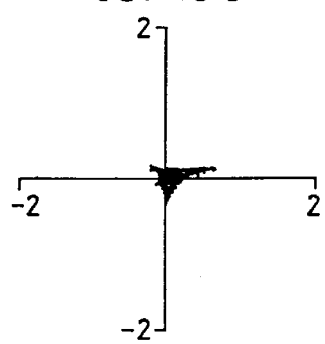
Figure 13H:
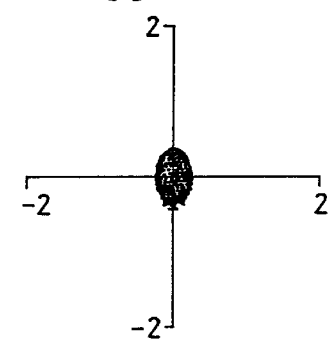
Figure 13I:
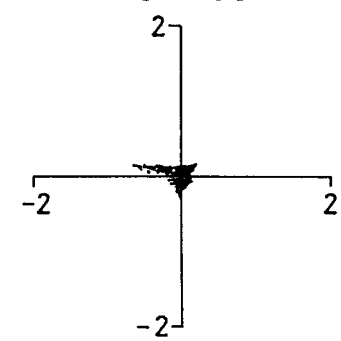

FIG. 11 is a diagram schematically showing the optical system of the oblique projection optical apparatus of a first embodiment of the invention. As shown in FIG. 11, the light from an image provided on an image-providing member 1 is projected obliquely onto a screen 3 by a projection lens unit 7. As shown in FIG. 12, the projection lens unit 7 is composed of six lens elements, of which the lens elements arranged in front of an aperture diaphragm 8 constitute a front lens unit, and the lens elements arranged behind it constitute a rear lens unit; the front and rear lens units are decentered with respect to each other to correct aberrations. Moreover, the projection lens unit 7 is arranged with an inclination to achieve the reduction of its aperture diameter.

The construction data of the optical system of the first embodiment is listed in Table 1. In Table 1, positions are represented as coordinates in the coordinate system, shown in FIG. 12, whose X-Y plane is on the plane of the page, whose Z axis is perpendicular thereto, and whose origin is at the center of the aperture diaphragm 8. The X axis is perpendicular to the screen 3, and its positive direction is from the screen 3 to the projection lens unit 7. The projection angle, that is, the angle formed by the line connecting the origin to the center of the screen 3 with respect to a normal to the screen 3 is 32°.

In the construction data of the optical system, ri (i=1, 2, 3, . . . ) represents the radius of curvature of the i-th surface counted from the object side, and Nd and vd represent the refractive index relative to the d-line and the Abbe number of the i-th lens counted from the object side, respectively.

Figure 14:
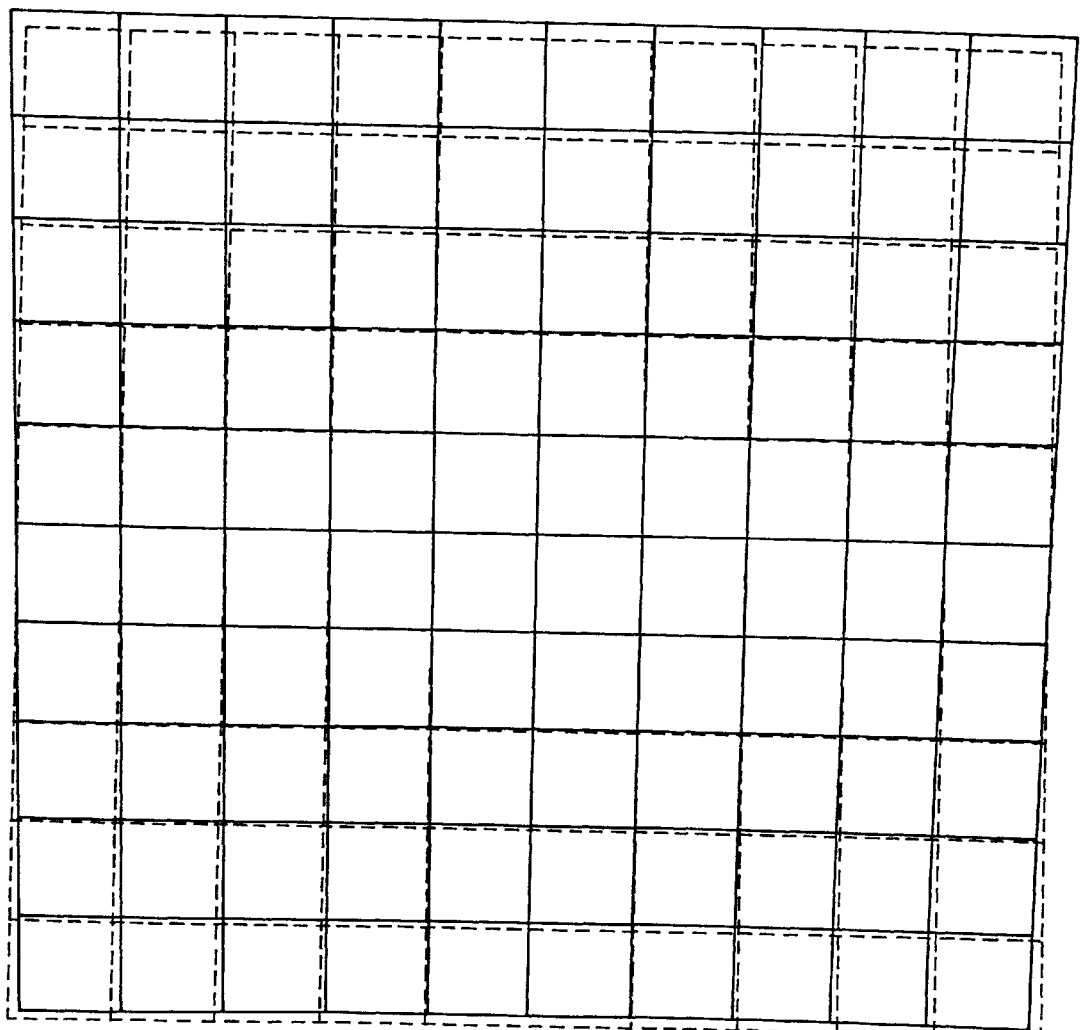
FIG. 14 is a distortion diagram of the optical system of the first embodiment.

FIGS. 13A to 13I are spot diagrams of the optical system of the first embodiment, and FIG. 14 is a distortion diagram of the optical system of the first embodiment. As seem from these figures, the optical system of the first embodiment exhibits sufficiently small variations in the positions of projected spots, and thus it can be used to project images without any noticeable distortion.

Figure 15:
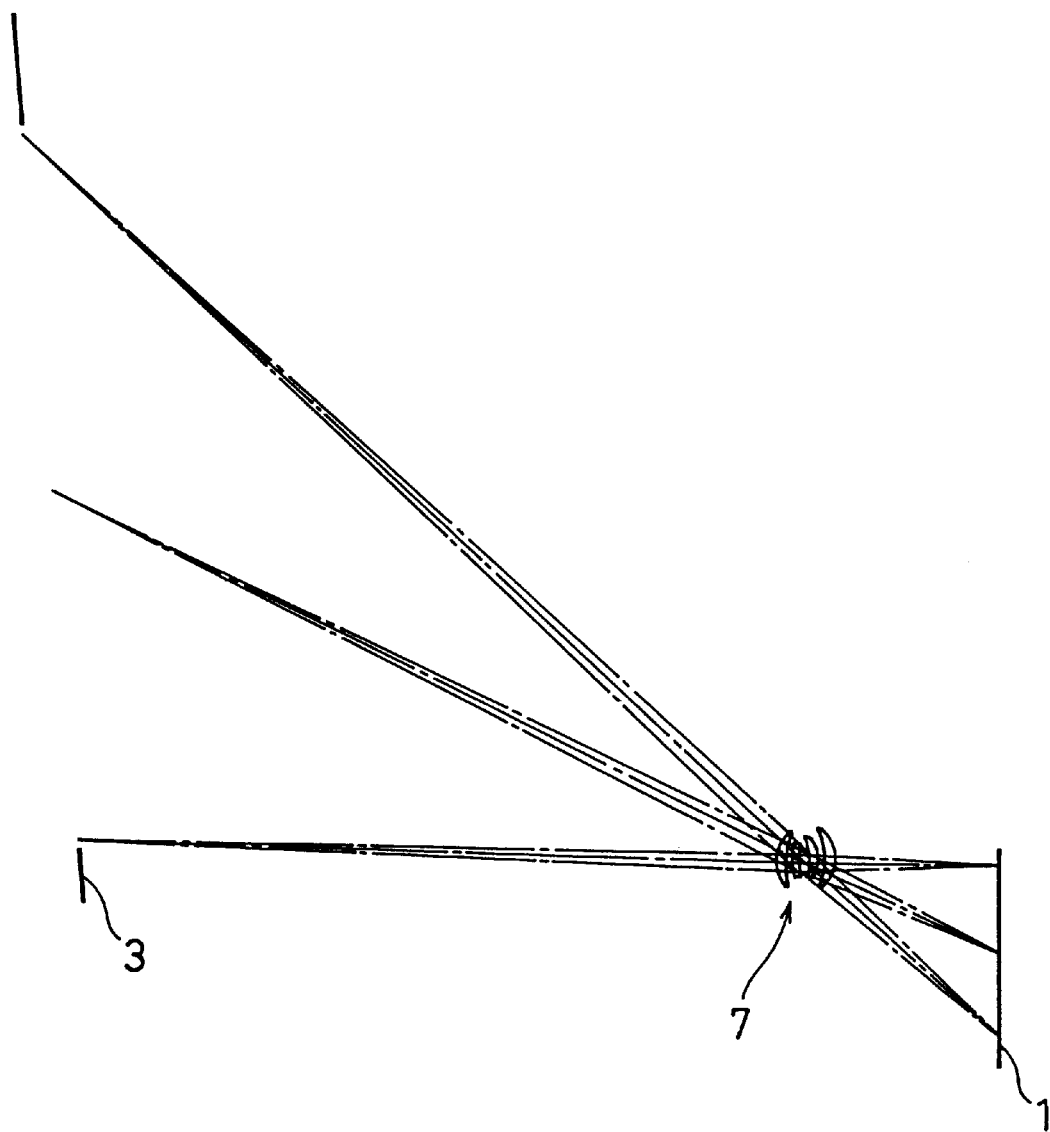
FIG. 15 is a diagram showing the state of the optical system of the first embodiment when it is adjusted to a projection distance shorter than that of FIG. 11.
Figure 16:
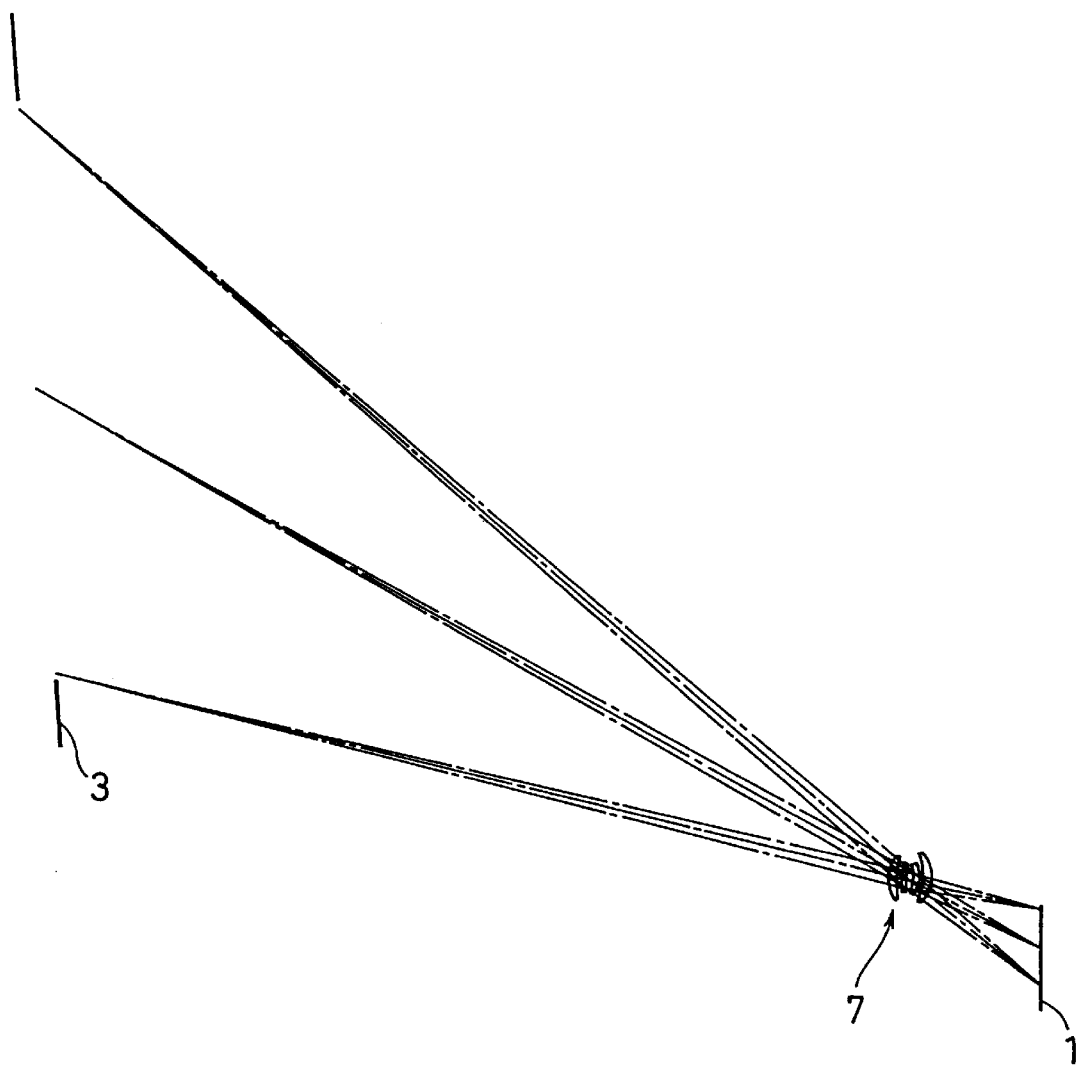
FIG. 16 is a diagram showing the state of the optical system of the first embodiment when it is adjusted to a projection distance longer than that of FIG. 11.

FIGS. 15 and 16 are diagrams schematically showing the states of the optical system of the first embodiment when it is adjusted, by focusing, to shorter and longer projection distances than in FIG. 11. To achieve these states, the projection distance is changed by changing the positions (coordinates) of the screen 3 and the original-providing member 1 so that the construction data listed in Table 1 will be kept unchanged. Specifically, in FIG. 15, the distance from the aperture diaphragm 8 to the screen 3 is shortened to 1.5 m, and, in FIG. 16, the distance from the aperture diaphragm 8 to the screen 3 is lengthened to 2.4 m.

The positions of the screen 3 and the original-providing member 1 when the optical system is in the states shown in FIGS. 11, 15, and 16 are listed in Tables 2, 3, and 4, respectively. Focusing is achieved by moving the projection lens unit 7 along the line connecting the center of the aperture diaphragm 8 to the center of the surface of the original-providing member 1, and meanwhile the angle formed by that line with respect to a normal to the surface of the original-providing member 1 is kept 29.4°. That is, during focusing, the projection lens unit 7 is moved without changing its inclination, and the original-providing member 1 and the screen 3 are kept in fixed positions.

Figure 17A:
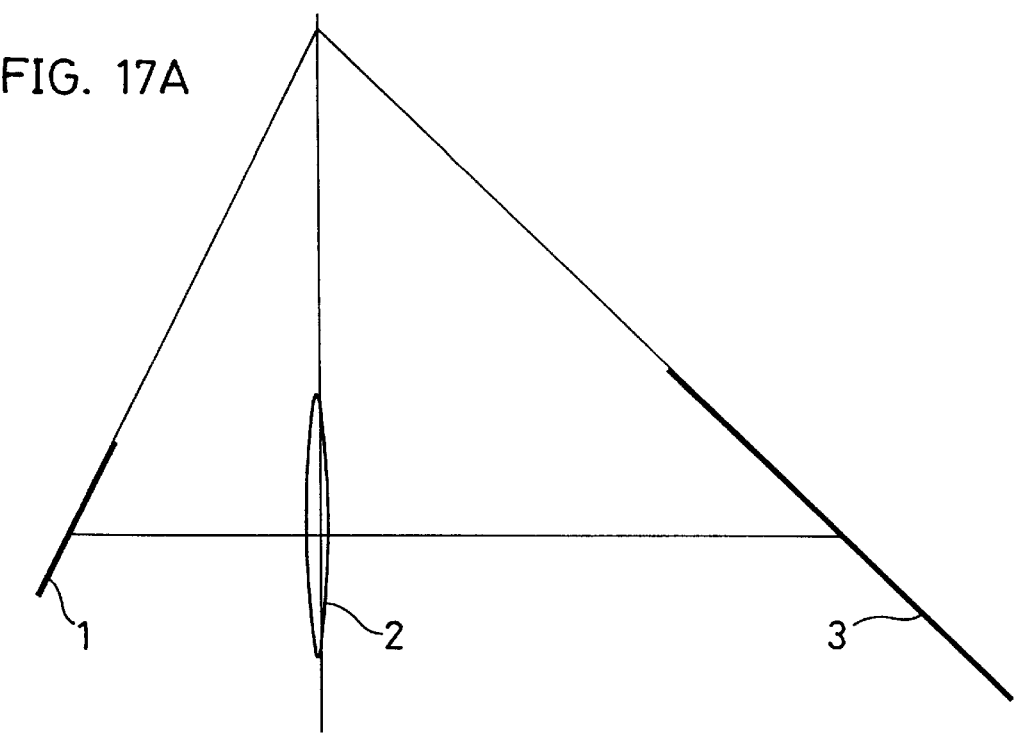
FIGS. 17A to 17C are diagrams illustrating problems associated with oblique projection of an image.
Figure 17B:
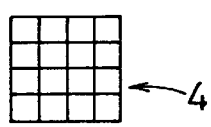
Figure 17C:
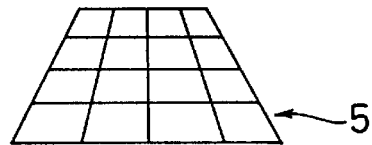

As shown in FIGS. 17A to 17C, in a case where an image provided by an original-providing member 1 is projected obliquely through a centered optical system 2 onto a screen 3 arranged with an inclination with respect to the optical axis of the optical system 2, the original-providing member 1 needs to be arranged with an inclination opposite to that of the screen 3 in order to obtain a well-focused image over the entire surface of the screen 3. In this case, the optical system 2 has varying projection magnifications for different parts between the top edge and the bottom edge of the original-providing member 1, and therefore, when the image 4 on the original-providing member 1 is projected onto the screen 3, it forms an image 5 with trapezoid distortion.

Figure 18:
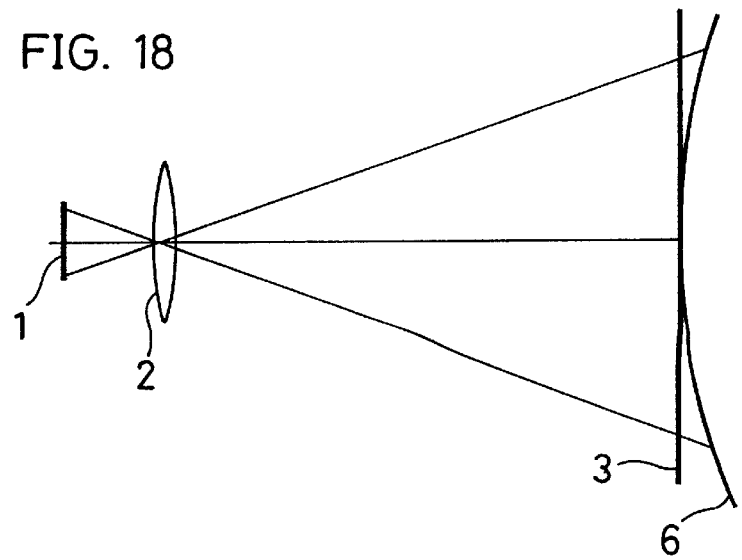
FIG. 18 is a diagram showing an optical system that causes curvature of field.
Figure 19:
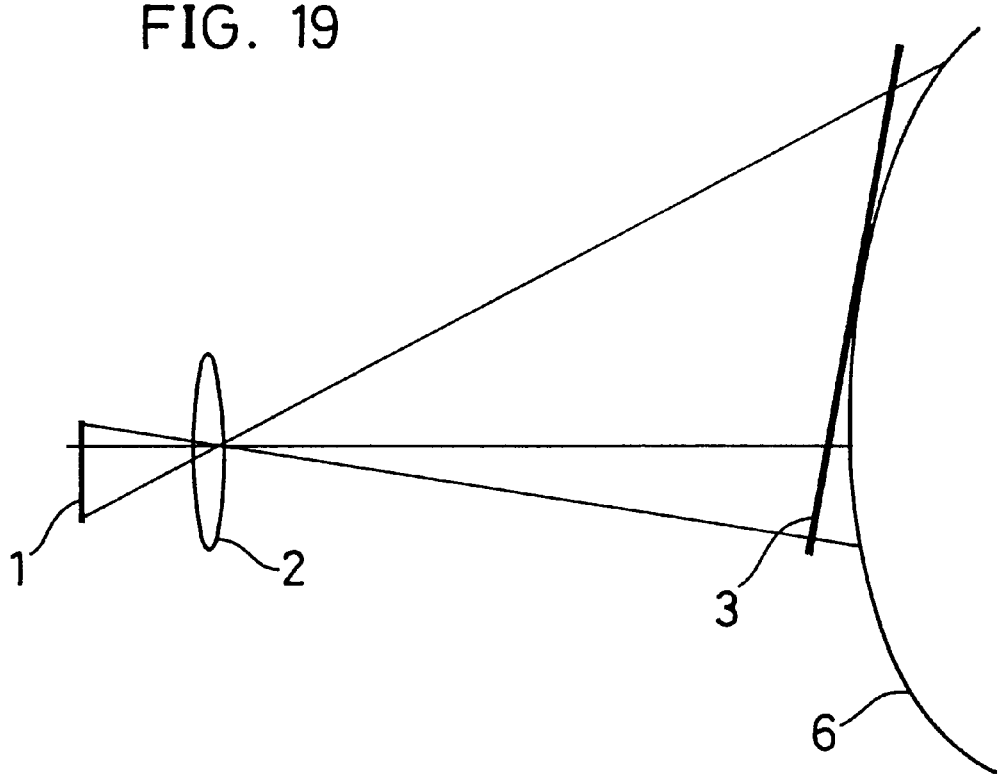
FIG. 19 is a diagram illustrating the outcome of oblique projection of an image from the optical system shown in FIG. 18.

Now assume that the optical system 2 has refractive indices n and n' at its entrance and exit surfaces respectively, and that the both surfaces have a radius of curvature r. As shown in FIG. 18, if the optical system 2 has a positive Petzval sum $\Sigma\{(1/r)(1/n-1/n')\}$, the image surface 6 is convex toward the optical system 2. As shown in FIG. 19, in this optical system 2, if the center of the original-providing member 1 is shifted away from the optical axis of the optical system 2, the part of the image plane 6 onto which the image on the original-providing member 1 is projected becomes inclined with respect to a plane perpendicular to the optical axis.

Figure 20:
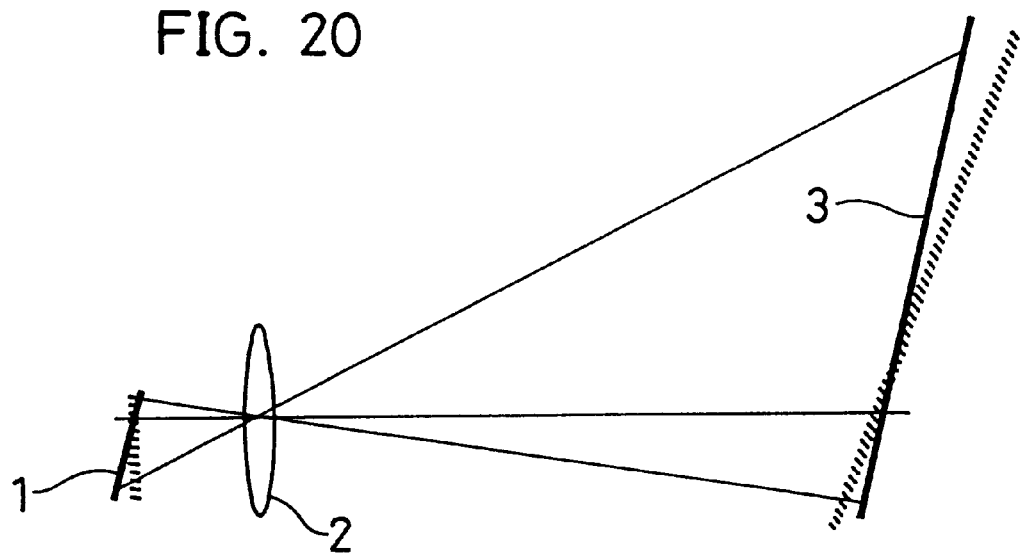
FIG. 20 is a diagram showing an arrangement in which the original-providing member and the screen surface are arranged parallel to each other.

This means that, whenever the original-providing member 1 and the screen 3 are not parallel to each other, trapezoid distortion appears. As shown in FIG. 20, in such a case, tilting the original-providing member 1 in the same direction as the inclination of the image plane 6 causes the image plane 6, and thus the screen 3, to become less inclined in that direction. Accordingly, in this way, by finding the position in which the original-providing member 1 and the screen 3 become parallel to each other, it is possible to eliminate the above-noted trapezoid distortion.

Figure 29:
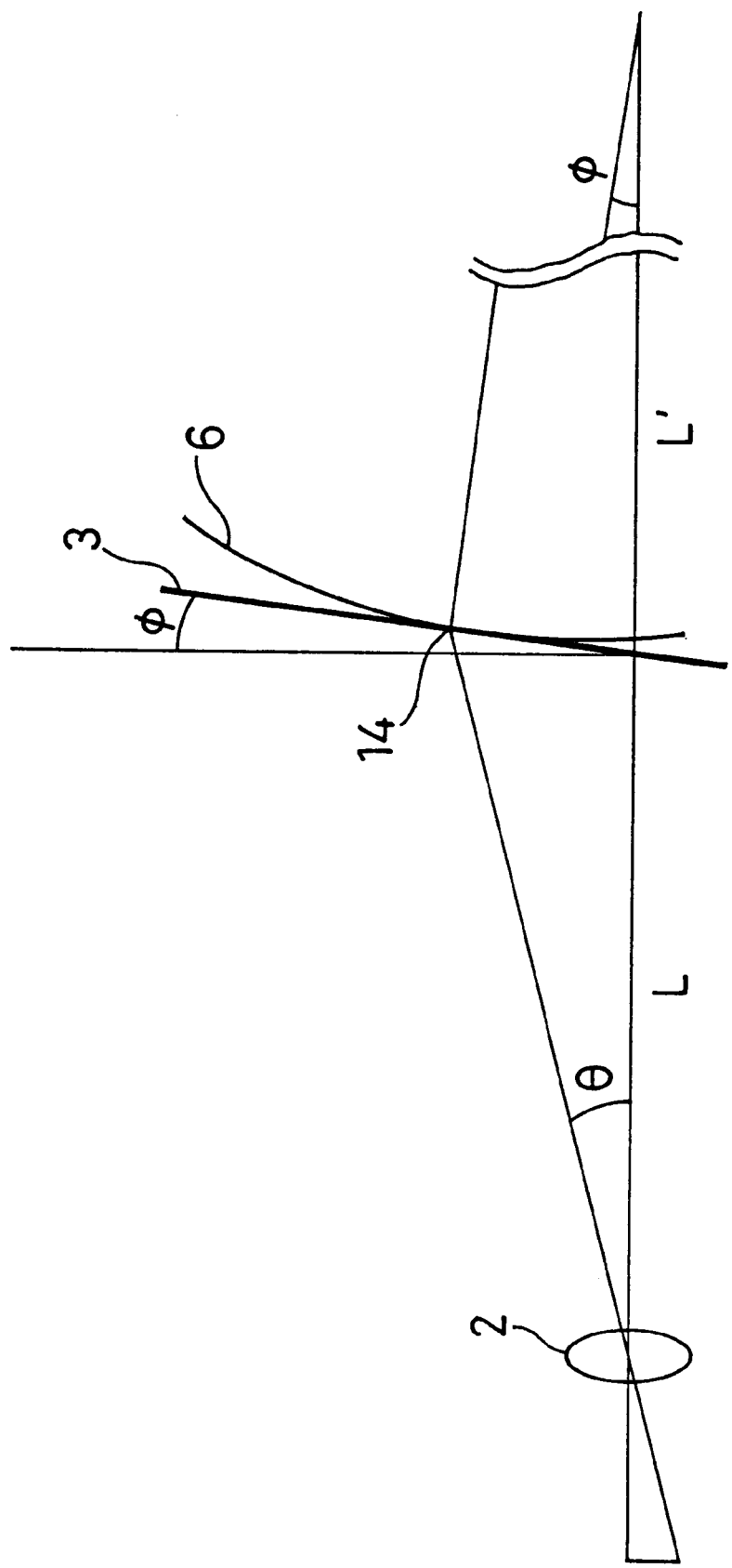
FIG. 29 is a diagram illustrating the derivation of the conditions to be satisfied in the oblique projection of an image are derived.

More precisely, as shown in FIG. 29, in an optical system (projection lens unit) 2 having a positive Petzval sum, when an image is projected onto a screen 3 by using an off-axial light beam, the plane that is tangent to the image plane 6 at the center 14 of the screen 3 has an inclination φ with respect to a plane perpendicular to the axis of symmetry of the optical system 2. Accordingly, by designing the optical system 2 to exhibit curvature of field large enough to provide a sufficiently large inclination φ of the tangent plane, it is possible to obtain a sufficiently large projection angle.

In FIG. 29, let the distance from the optical system 2 to the screen 3 be L, the radius of curvature of the image plane 6 be L', and the projection angle of the optical system 2 be θ. Then, the following relation holds:

$$L \tan \theta = L' \tan \phi.$$

To obtain a projection angle θ of 20° while limiting the inclination φ of the tangent plane to 5° at maximum, the following condition needs to be satisfied:

$$L'/L = \tan \theta / \tan \phi < \tan (20) / \tan (5) = 4.2.$$

Accordingly, as long as L'<4L, it is possible to obtain as large a projection angle as desired. Since the Petzval sum is the reciprocal of the radius of curvature of the image plane, condition (2) below is obtained:

$$\sum_i \left\{ \left(\frac{1}{ri}\right)\left(\frac{1}{ni} - \frac{1}{n'i}\right) \right\} > \frac{0.25}{L} \qquad (2)$$

where ri represents the radius of curvature of the i-th refractive surface included in the projection lens system, ni represents the refractive index of the medium that exists on the object side of the i-th refractive surface included in the projection lens system, and n'i represents the refractive index of the medium that exists on the image side of the i-th refractive surface included in the projection lens system.

If the optical system 2 does not satisfy condition (2) above, it is not possible, when an image is projected obliquely, to obtain a sufficiently large angle φ between the plane that is tangent to the image plane 6 at the center 14 of the screen 3 and a plane perpendicular to the axis of symmetry of the optical system 2, and therefore the optical system 2 requires a very complicate construction. By the way, the image formation characteristics of this optical system 2 can be further improved by designing it to include more than two lens units that are decentered with respect to each other. The embodiments of the present invention described in the following descriptions are characterized by the features noted heretofore.

Figure 21:
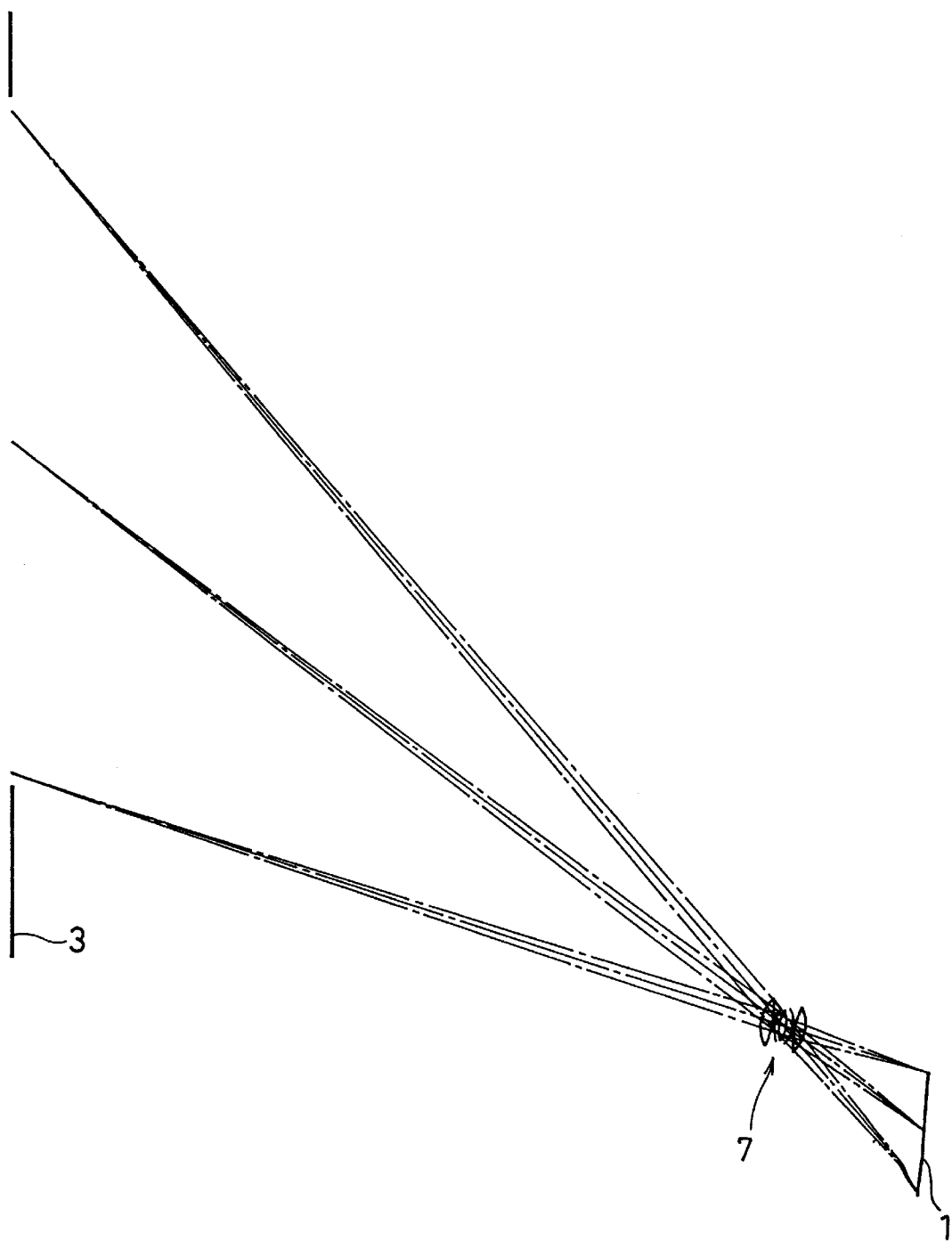
FIG. 21 is a diagram showing the optical system of the oblique projection optical apparatus of a second embodiment of the invention.
Figure 22:
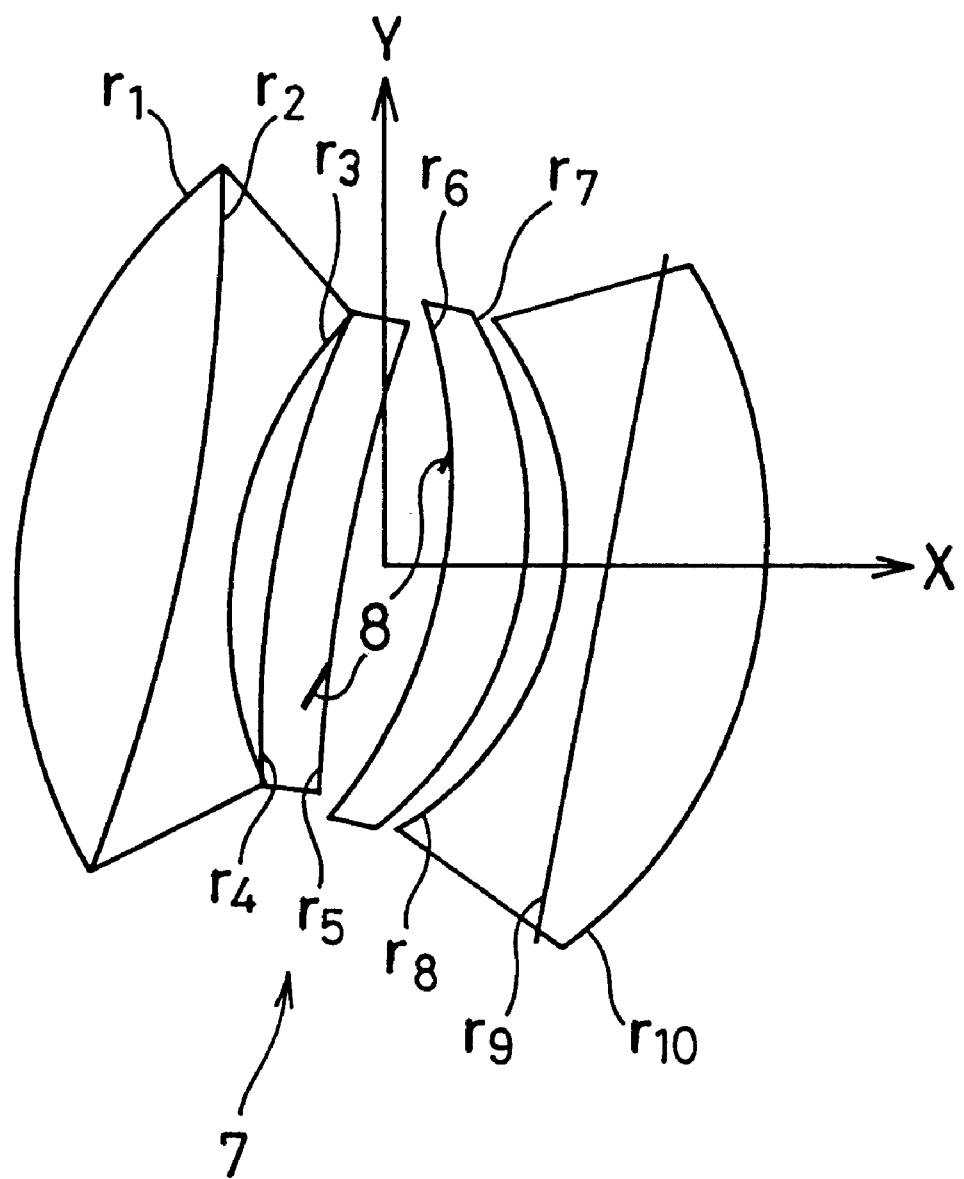
FIG. 22 is a diagram showing the construction of the projection lens unit used in the second embodiment.
Figure 23A:
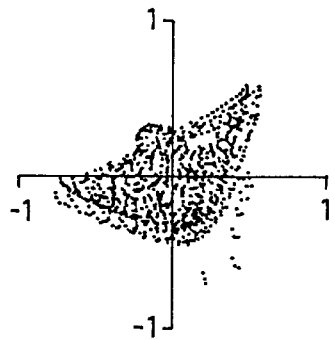
FIGS. 23A to 23I are spot diagrams of the optical system of the second embodiment.
Figure 23B:
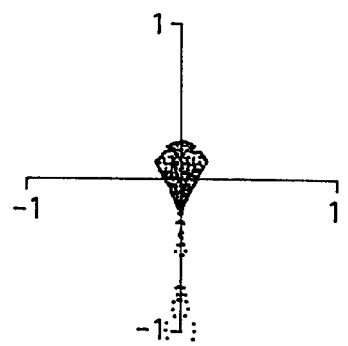
Figure 23C:
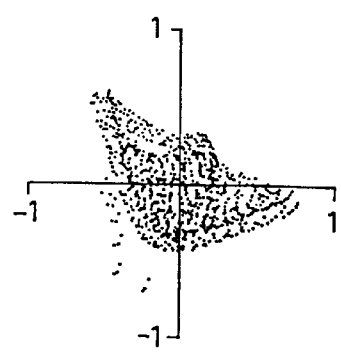
Figure 23D:
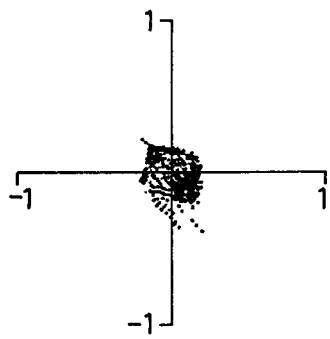
Figure 23E:
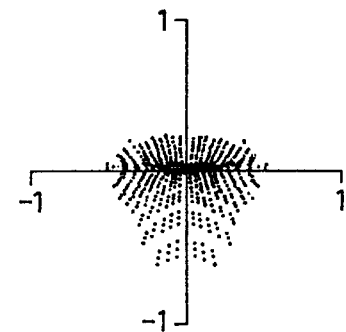
Figure 23F:
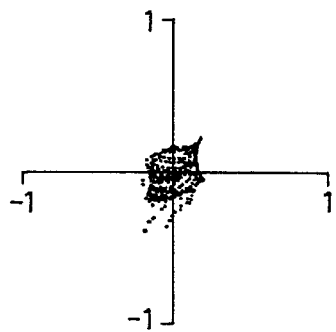
Figure 23G:
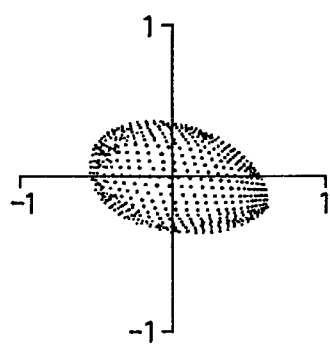
Figure 23H:
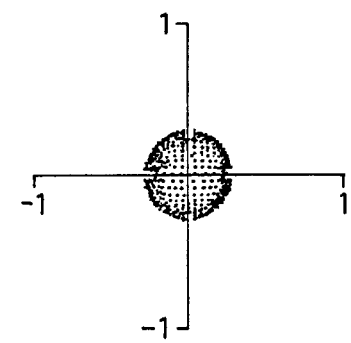
Figure 23I:
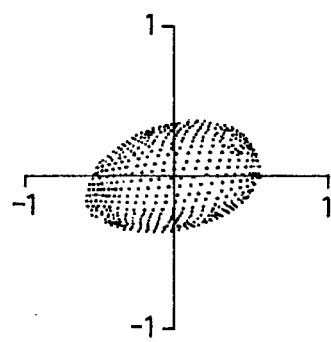

FIG. 21 is a diagram schematically showing the optical system of the oblique projection optical apparatus of a second embodiment of the invention. As shown in FIG. 21, the light from an image provided on an image-providing member 1 is projected obliquely onto a screen 3 by a projection lens unit 7. As shown in FIG. 22, the projection lens unit 7 is a centered optical system composed of six lens elements. The construction data of the optical system of the second embodiment is listed in Table 5. In Table 5, positions are represented as coordinates in the coordinate system, shown in FIG. 22, whose X-Y plane is on the plane of the figure, whose Z axis is perpendicular thereto, and whose origin is at the center of an aperture diaphragm 8. The X axis is perpendicular to the surface of the screen 3, and its positive direction is from the surface of the screen 3 to the projection lens unit 7. In the second embodiment, the projection angle, that is, the angle formed by the line connecting the origin to the center of the surface of the screen 3 with respect to a normal to the surface of the screen 3 is 34°.

In the second embodiment, the aperture diaphragm 8 is arranged with an inclination for the following reason. As shown in FIG. 8, if the aperture diaphragm 8 is arranged parallel to the original-providing member 1, the rays that enter the aperture diaphragm 8 from points P and Q at the top and bottom edges of the original-providing member 1 cover different angles A and B, respectively. As a result, in the image projected onto the screen 3, the part formed by the rays from point P is brighter than the part formed by the rays from point Q. This uneven distribution of brightness over the surface of the screen 3 can be corrected by making the angles A and B equal, and this is achieved, as shown in FIG. 9, by arranging the aperture diaphragm 8 with such an inclination that allows the line connecting the center of the aperture diaphragm 8 to the center of the original-providing member 1 to cross the plane of the aperture diaphragm 8 at an angle close to a right angle.

Moreover, the projection lens unit 7 is also arranged with an inclination, and this contributes to the reduction of its aperture diameter. Furthermore, the projection lens unit 7 is designed to be a centered optical system as a whole except for the aperture diaphragm 8, and this allows the use of a low-cost lens barrel. Moreover, as shown in the construction data listed in Table 5, distortion can be corrected effectively if the angle between the surface of the screen and the surface of the original-providing member is limited to 5° or less. The data needed for calculating the Petzval sum of the optical system of the second embodiment is listed in Table 6.

In the construction data of the optical system, ri (i=1, 2, 3, . . . ) represents the radius of curvature of the i-th surface counted from the object side, and Nd and vd represent the refractive index relative to the d-line and the Abbe number of the i-th lens counted from the object side, respectively.

Here, if it is assumed, as noted previously, that the distance from the center of the screen 3 to the aperture diaphragm 8 is L, then $0.25/L = 1.3 \times 10^{-4}$. On the other hand, from Table 6, the Petzval sum is $4.768 \times 10^{-4}$. Thus, with the Petzval sum greater than 0.25/L, the optical system of the second embodiment satisfies the previously-noted condition (2) for desirable curvature of field.

Figure 24:
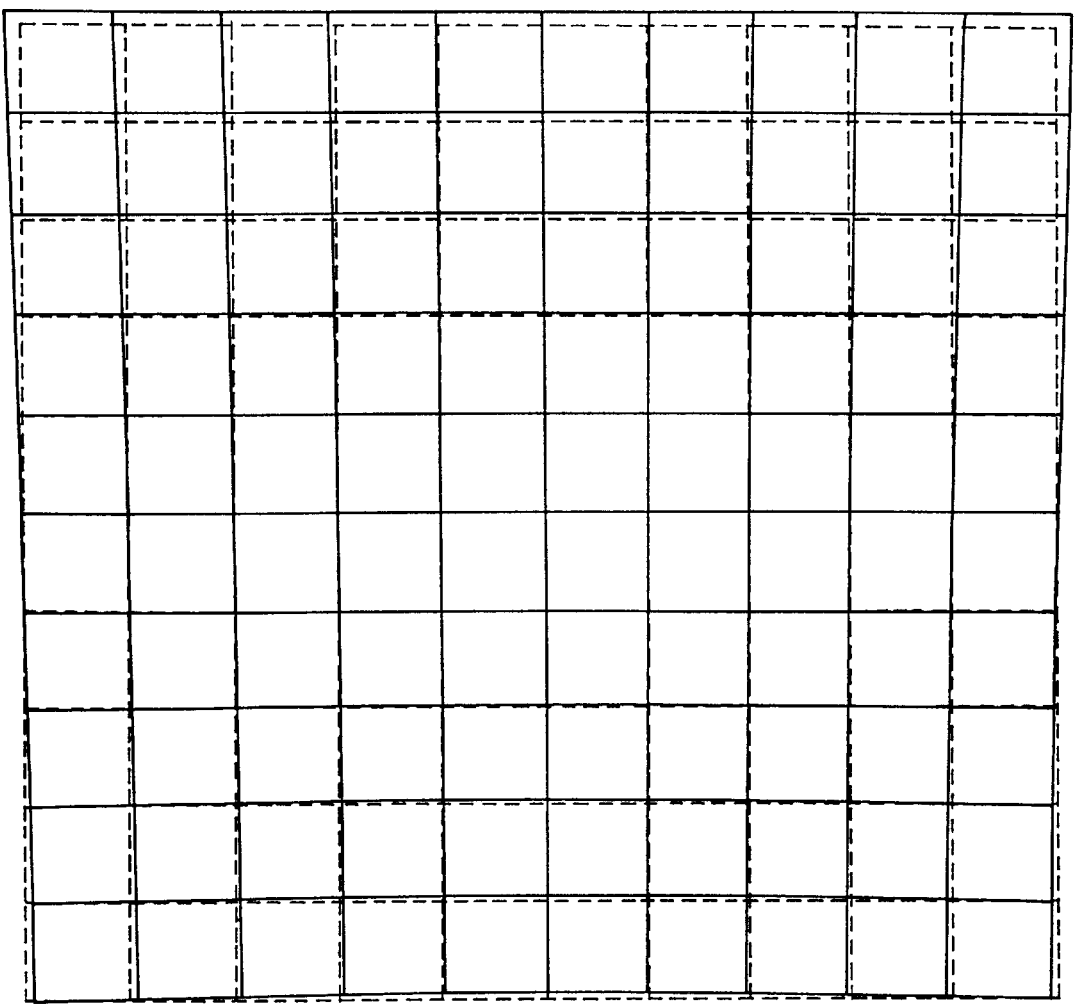
FIG. 24 is a distortion diagram of the optical system of the second embodiment.

FIGS. 23A to 23I are spot diagrams of the optical system of the second embodiment, and FIG. 24 is a distortion diagram of the optical system of the second embodiment. As seem from these figures, the optical system of the second embodiment exhibits sufficiently small variations in the positions of projected spots, and thus it can be used to project images without any noticeable distortion.

Figure 25:
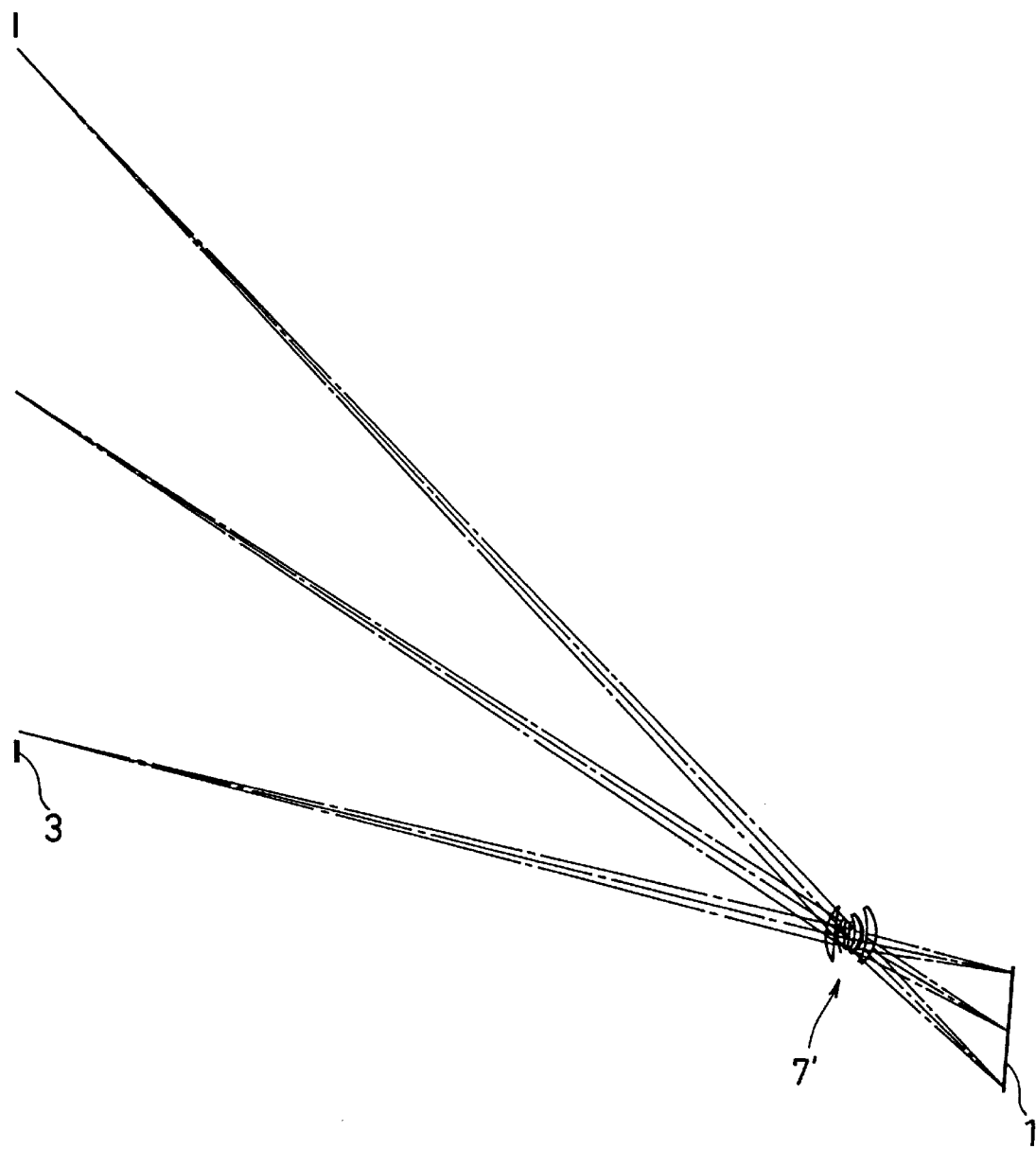
FIG. 25 is a diagram showing the optical system of the oblique projection optical apparatus of a third embodiment of the invention.
Figure 26:
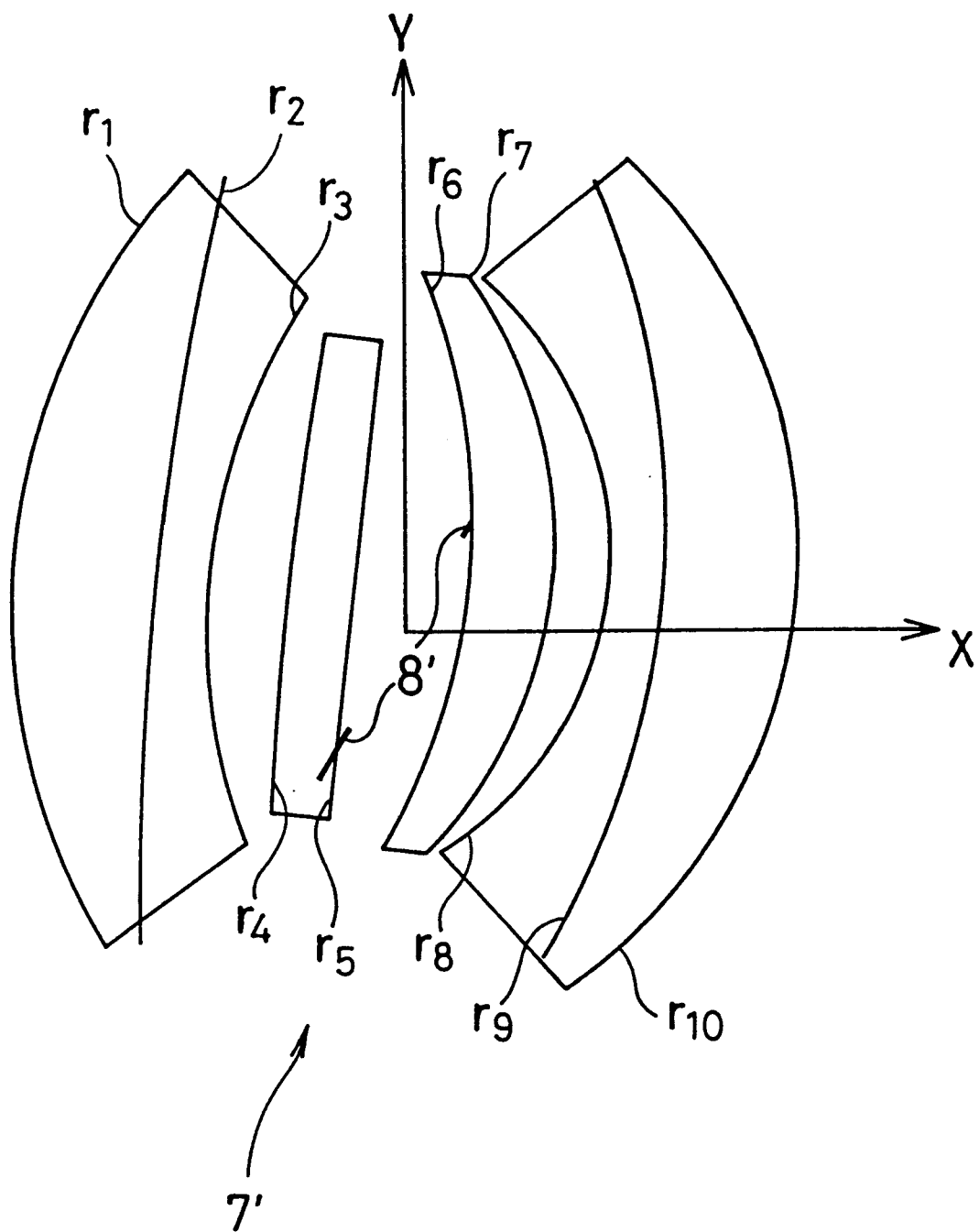
FIG. 26 is a diagram showing the construction of the projection lens unit used in the third embodiment.
Figure 27A:
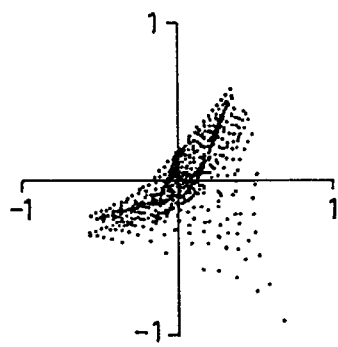
FIGS. 27A to 27I are spot diagrams of the optical system of the third embodiment.
Figure 27B:
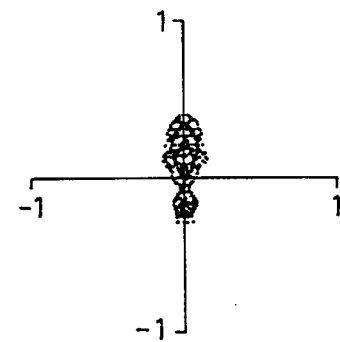
Figure 27C:
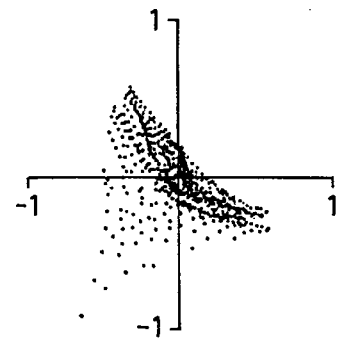
Figure 27D:
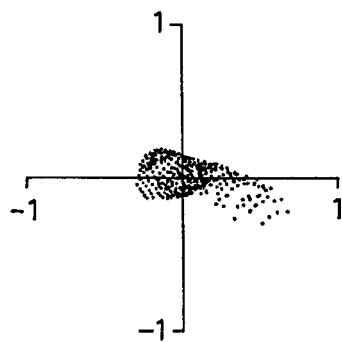
Figure 27E:
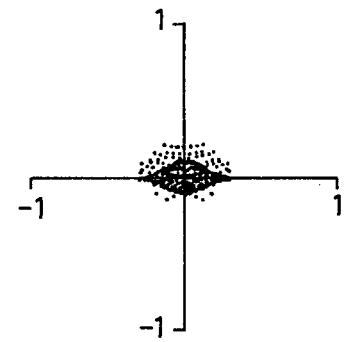
Figure 27F:
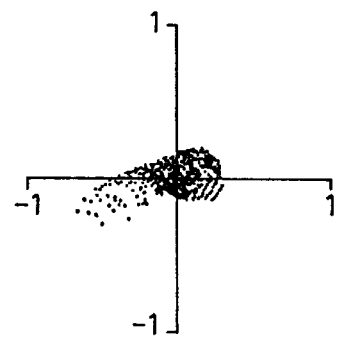
Figure 27G:
Figure 27H:
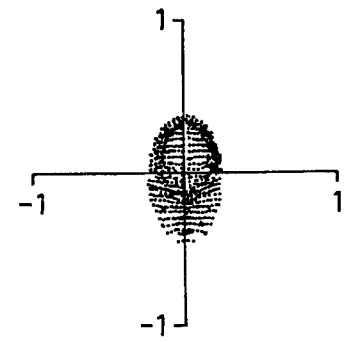
Figure 27I:
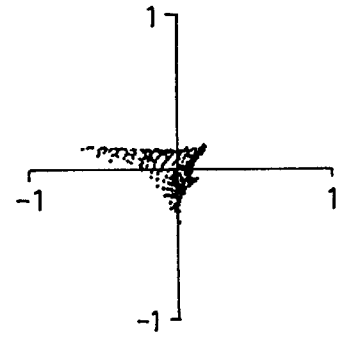

FIG. 25 is a diagram schematically showing the optical system of the oblique projection optical apparatus of a third embodiment of the invention. As shown in FIG. 25, the light from an image provided on an image-providing member 1 is condensed and directed obliquely into a projection lens unit 7', and is then projected onto a screen 3. As shown in FIG. 26, the projection lens unit 7' is composed of six lens elements, of which the lens elements arranged in front of an aperture diaphragm 8' constitute a front lens unit, and the lens elements arranged behind it constitute a rear lens unit;

the front and rear lens units are decentered with respect to each other to correct aberrations. The construction data of the optical system of the third embodiment is listed in Table 7. In Table 7, positions are represented as coordinates in the coordinate system, shown in FIG. 26, whose X-Y plane is on the plane of the figure, whose Z axis is perpendicular thereto, and whose origin is at the center of the aperture diaphragm 8'. The X axis is perpendicular to the surface of the screen 3, and its positive direction is from the surface of the screen 3 to the projection lens unit 7'. The projection angle is 32°.

In the construction data of the optical system, ri (i=1, 2, 3, . . . ) represents the radius of curvature of the i-th surface counted from the object side, and Nd and vd represent the refractive index relative to the d-line and the Abbe number of the i-th lens counted from the object side, respectively.

Also in the third embodiment, the aperture diaphragm 8' is arranged with an inclination for the same reason as stated previously in connection with the aperture diaphragm 8 of the second embodiment. Moreover, just as with the previously-described projection lens unit 7, the projection lens unit 7' is arranged with an inclination to achieve the reduction of its aperture diameter. Furthermore, as shown in the construction data listed in Table 7, distortion can be corrected effectively if the angle between the surface of the screen and the surface of the original-providing member is limited to 5° or less. The data needed for calculating the Petzval sum of the optical system of the third embodiment is listed in Table 8.

Here, if it is assumed, as noted previously, that the distance from the center of the screen 3 to the aperture diaphragm 8' is L, then $0.25/L = 1.1 \times 10^{-4}$. On the other hand, from Table 8, the Petzval sum is $7.270 \times 10^{-4}$. Thus, with the Petzval sum greater than $0.25/L$, the optical system of the third embodiment satisfies the previously-noted condition (2) for desirable curvature of field.

Figure 28:
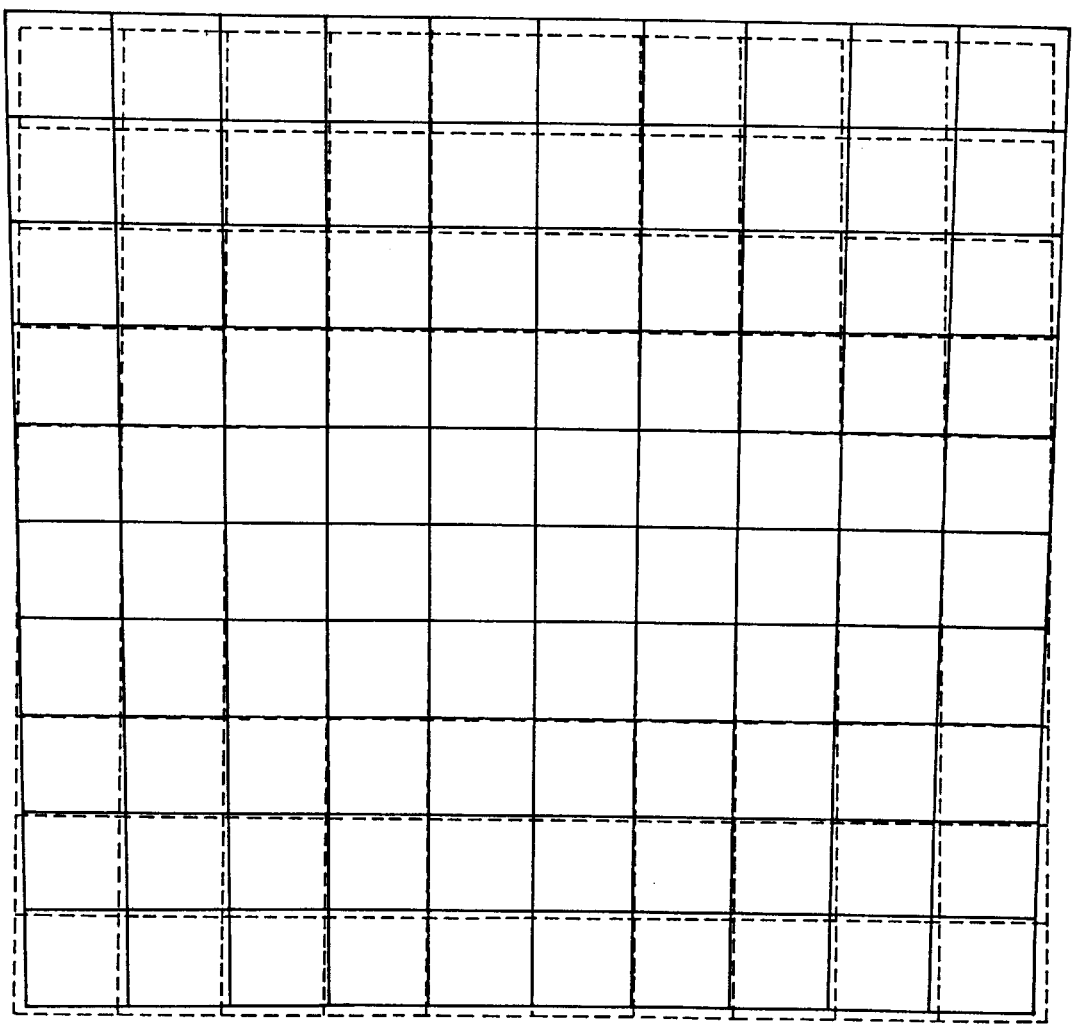
FIG. 28 is a distortion diagram of the optical system of the third embodiment.

FIGS. 27A to 27I are spot diagrams of the optical system of the third embodiment, and FIG. 28 is a distortion diagram of the optical system of the third embodiment. As seem from these figures, the optical system of the third embodiment exhibits sufficiently small variations in the positions of projected spots, and thus it can be used to project images without any noticeable distortion.

In the embodiments described heretofore, where a primary image is through projection formed into an enlarged secondary image, the reduction-side image plane corresponds to the primary image plane and the enlargement-side image plane corresponds to the secondary image plane. However, it should be understood that, in cases where a primary image is through projection formed into a reduced secondary image, the enlargement-side image plane of the above embodiments corresponds to the primary image plane and the reduction-side image plane corresponds to the secondary image plane.

TABLE 1

<< Construction Data of Embodiment 1 >>

<SCR.> (Screen Surface)
Center of the Screen: XS = −1987.5
YS = 1200.0
Rotation Angle: θS = 0.0
Projection Size: 1500 × 1500
<OBJ.> (Original-Providing Member)
Center of the Transparent Original: XO = 360.1
Rotation Angle: θO = 4.3
<Grp. 1 of the Projection Lens Unit 7>

TABLE 1-continued

Vertex of the First Surface: X1 = −59.32
Y1 = 13.8
Rotation Angle: θ1 = 6.5

| Surface | Radius of Curvature | Axial Distance | Index of Refraction | Abbe Number |
|---------|---------------------|----------------|---------------------|-------------|
| r1 | 98.984 | | 1.69680 | 56.47 |
| | | 22.0 | | |
| r2 | 465.224 | | 1.58144 | 40.83 |
| | | 8.0 | | |
| r3 | 95.452 | | | |
| | | 12.0 | | |
| r4 | 493.822 | | 1.61800 | 63.39 |
| | | 10.0 | | |
| r5 | ∞ | | | |

<Aperture Diaphragm 8>
Center of the Aperture: X = 0.0
Y = 0.0
Rotation Angle: θ = 30.0
Diameter of the Aperture: 35.0
<Grp. 2 of the Projection Lens Unit 7>
Vertex of the First Surface: X2 = 9.68
Y2 = 9.79
Rotation Angle: θ2 = 4.4

| Surface | Radius of Curvature | Axial Distance | Index of Refraction | Abbe Number |
|---------|---------------------|----------------|---------------------|-------------|
| r6 | −106.144 | | 1.61800 | 63.39 |
| | | 12.5 | | |
| r7 | −71.927 | | | |
| | | 8.5 | | |
| r8 | −56.675 | | 1.58144 | 40.83 |
| | | 8.0 | | |
| r9 | −136.513 | | 1.69680 | 56.47 |
| | | 20.0 | | |
| r10 | −84.930 | | | |

TABLE 2

<< Projection Angle = 2 m (FIG. 5) >>

<SCR.> (Screen Surface)
Center of the Screen: XS = −1987.5
YS = 1200.0
Rotation Angle: θS = 0.0
<OBJ.> (Original-Providing Member)
Center of the Transparent Original: XO = 360.1
YO = −202.9
Rotation Angle: θO = 4.3

TABLE 3

<< Projection Angle = 1.5 m (FIG. 9) >>

<SCR.> (Screen Surface)
Center of the Screen: XS = −1500.0
YS = 905.6
Rotation Angle: θS = 0.0
<OBJ.> (Original-Providing Member)
Center of the Transparent Original: XO = 382.2
YO = −215.4
Rotation Angle: θO = 4.3

TABLE 4

<< Projection Angle = 2.4 m (FIG. 10) >>

<SCR.> (Screen Surface)
Center of the Screen: XS = −2400.0

TABLE 4-continued

<< Projection Angle = 2.4 m (FIG. 10) >>

| | |
|---|---|
| | YS = 1449.1 |
| Rotation Angle: | θS = 0.0 |
| <OBJ.> (Original-Providing Member) | |
| Center of the | XO = 349.6 |
| Transparent Original: | YO = −196.9 |
| Rotation Angle: | θO = 4.3 |

TABLE 5

<< Construction Data of Embodiment 2 >>

| | |
|---|---|
| <SCR.> (Screen Surface) | |
| Center of the Screen: | XS = −1590.0 |
| | YS = 1050.0 |
| Rotation Angle: | θS = 0.0 |
| Projection Size: | 1200 × 1200 |
| <OBJ.> (Original-Providing Member) | |
| Center of the Original- | XO = 304.0 |
| Providing Member: | |
| Rotation Angle: | θO = 4.7 |
| <Projection Lens Unit 7> | |
| Rotation Angle: | θ = 11.0 |

| Surface | Radius of Curvature | Axial Distance | Index of Refraction | Abbe Number |
|---|---|---|---|---|
| r1 | 70.048 | | 1.62280 | 56.88 |
| | | 20.75 | | |
| r2 | −251.997 | | 1.54072 | 47.22 |
| | | 5.75 | | |
| r3 | 56.220 | | | |
| | | 5.00 | | |
| r4 | 116.200 | | 1.55753 | 67.17 |
| | | 8.75 | | |
| r5 | 208.912 | | | |
| | ∞ | 7.13 | | |

| Aperture Diaphragm 8 | (Diameter of the Aperture = 28, Rotation Angle = 30°) | | | |
|---|---|---|---|---|
| | | 7.13 | | |
| r6 | −69.701 | | 1.55753 | 67.17 |
| | | 10.00 | | |
| r7 | −50.978 | | | |
| | | 5.00 | | |
| r8 | −44.340 | | 1.54072 | 47.22 |
| | | 4.75 | | |
| r9 | 6547.73 | | 1.62280 | 56.88 |
| | | 20.00 | | |
| r10 | −66.5362 | | | |

TABLE 6

<< Petzval Sum of Embodiment 2 >>

| Surface | Radius of Curvature | Index of Refraction | (1/r) (1/n-1/n') |
|---|---|---|---|
| | | 1.00000 | |
| r1 | 70.048 | | 5.480 × 10⁻³ |
| | | 1.62300 | |
| r2 | −251.997 | | 1.301 × 10⁻⁴ |
| | | 1.54100 | |
| r3 | 56.220 | | −6.245 × 10⁻³ |
| | | 1.00000 | |
| r4 | 116.200 | | 3.082 × 10⁻³ |
| | | 1.55800 | |
| r5 | 208.912 | | −1.714 × 10⁻³ |
| | | 1.00000 | |
| r6 | −69.701 | | −5.138 × 10⁻³ |
| | | 1.55800 | |
| r7 | −50.978 | | 7.026 × 10⁻³ |

TABLE 6-continued

<< Petzval Sum of Embodiment 2 >>

| Surface | Radius of Curvature | Index of Refraction | (1/r) (1/n-1/n') |
|---|---|---|---|
| | | 1.00000 | |
| r8 | −44.340 | | −7.918 × 10⁻³ |
| | | 1.54100 | |
| r9 | 6547.730 | | 5.007 × 10⁻⁶ |
| | | 1.62300 | |
| r10 | −66.536 | | 5.769 × 10⁻³ |
| | | 1.00000 | |
| (Total) | | | 4.768 × 10⁻⁴ |

TABLE 7

<< Construction Data of Embodiment 3 >>

| | |
|---|---|
| <SCR.> (Screen Surface) | |
| Center of the Screen: | XS = −1987.5 |
| | YS = 1200.0 |
| Rotation Angle: | θS = 0.0 |
| Projection Size: | 1500 × 1500 |
| <OBJ.> (Original-Providing Member) | |
| Center of the | XO = 360.1 |
| Transparent Original: | |
| Rotation Angle: | θO = 4.3 |
| <Grp. 1 of the Projection Lens Unit 7'> | |
| Vertex of the First | X1 = −59.32 |
| Surface: | Y1 = 13.8 |
| Rotation Angle: | θ1 = 6.5 |

| Surface | Radius of Curvature | Axial Distance | Index of Refraction | Abbe Number |
|---|---|---|---|---|
| r1 | 98.984 | | 1.69680 | 56.47 |
| | | 22.0 | | |
| r2 | 465.224 | | 1.58144 | 40.83 |
| | | 8.0 | | |
| r3 | 95.452 | | | |
| | | 12.0 | | |
| r4 | 493.822 | | 1.61800 | 63.39 |
| | | 10.0 | | |
| r5 | ∞ | | | |

| | |
|---|---|
| <Aperture Diaphragm 8'> | |
| Center of the Aperture: | X = 0.0 |
| | Y = 0.0 |
| Rotation Angle: | θ = 30.0 |
| Diameter of the Aperture: | 35.0 |
| <Grp. 2 of the Projection Lens Unit 7'> | |
| Vertex of the First | X2 = 9.68 |
| Surface: | Y2 = 9.79 |
| Rotation Angle: | θ2 = 4.4 |

| Surface | Radius of Curvature | Axial Distance | Index of Refraction | Abbe Number |
|---|---|---|---|---|
| r6 | −106.144 | | 1.61800 | 63.39 |
| | | 12.5 | | |
| r7 | −71.927 | | | |
| | | 8.5 | | |
| r8 | −56.675 | | 1.58144 | 40.83 |
| | | 8.0 | | |
| r9 | −136.513 | | 1.69680 | 56.47 |
| | | 20.0 | | |
| r10 | −84.930 | | | |

TABLE 8

<< Petzval Sum of Embodiment 3 >>

| Surface | Radius of Curvature | Index of Refraction | (1/r) (1/n-1/n') |
|---------|---------------------|---------------------|------------------|
|         |                     | 1.00000             |                  |
| r1      | 98.984              |                     | $4.149 \times 10^{-3}$ |
|         |                     | 1.69700             |                  |
| r2      | 465.224             |                     | $-9.294 \times 10^{-5}$ |
|         |                     | 1.58100             |                  |
| r3      | 95.452              |                     | $-3.850 \times 10^{-3}$ |
|         |                     | 1.00000             |                  |
| r4      | 493.822             |                     | $7.735 \times 10^{-4}$ |
|         |                     | 1.61800             |                  |
| r5      | ∞                   |                     | $0.000 \times 10^{0}$ |
|         |                     | 1.00000             |                  |
| r6      | −106.144            |                     | $-3.598 \times 10^{-3}$ |
|         |                     | 1.61800             |                  |
| r7      | −71.927             |                     | $5.310 \times 10^{-3}$ |
|         |                     | 1.00000             |                  |
| r8      | −56.675             |                     | $-6.484 \times 10^{-3}$ |
|         |                     | 1.58100             |                  |
| r9      | −136.513            |                     | $-3.167 \times 10^{-4}$ |
|         |                     | 1.69700             |                  |
| r10     | −84.929             |                     | $4.836 \times 10^{-3}$ |
|         |                     | 1.00000             |                  |
| (Total) |                     |                     | $7.270 \times 10^{-4}$ |

What is claimed is:

1. A projection optical apparatus comprising a projection optical system for projecting an enlarged or reduced secondary image from a primary image,
    wherein a line connecting a center of an aperture diaphragm of the projection optical system to a center of an enlargement-side image plane forms a predetermined angle with respect to a line which is normal to the enlargement-side image plane,
    wherein the enlargement-side image plane and a reduction-side image plane are approximately parallel to each other, and
    wherein the projection optical system provides, on its enlargement side, a curvature of field which is convex toward the projection optical system.

2. A projection optical apparatus as claimed in claim 1, wherein optical elements of the projection optical system except for the aperture diaphragm, share a common optical axis.

3. A projection optical apparatus as claimed in claim 1, further comprising at least a first lens unit and a second lens unit,
    wherein said first lens unit and said second lens unit are arranged such that said first lens unit is decentered with respect to said second lens unit,
    wherein elements in said first lens unit share a first common optical axis, and
    wherein elements in said second lens unit share a second common optical axis.

4. A projection optical apparatus comprising a projection optical system for projecting an enlarged or reduced secondary image from a primary image,
    wherein a line connecting a center of an aperture diaphragm of the projection optical system to a center of an enlargement-side image plane forms a predetermined angle with respect to a line which is normal to the enlargement-side image plane,
    wherein the enlargement-side image plane and a reduction-side image plane are approximately parallel to each other, and wherein the following conditions are satisfied:

$$20 \leq \theta < 90$$

$$\sum_i \left\{ \left(\frac{1}{ri}\right)\left(\frac{1}{ni} - \frac{1}{n'i}\right) \right\} > \frac{0.25}{L},$$

wherein:
    θ represents an angle (in degrees) formed by the line connecting the center of the aperture diaphragm of the projection lens system to the center of the enlargement-side image plane with respect to a normal to the enlargement-side image plane,
    ri represents a radius of curvature of an i-th refractive surface included in the projection lens system,
    ni represents a refractive index of a medium that exists on an object side of an i-th refractive surface included in the projection lens system,
    n'i represents a refractive index of a medium that exists on an image side of an i-th refractive surface included in the projection lens system, and
    L represents a distance between the center of the enlargement-side image plane and the center of the aperture diaphragm of the projection lens system.

5. A projection optical apparatus as claimed in claim 4, wherein the angle between the enlargement-side and reduction-side image planes is 5° or less.

6. A projection optical apparatus as claimed in claim 4, wherein a line connecting the center of the aperture diaphragm of the projection optical system to a center of the reduction-side image plane is approximately perpendicular to the reduction-side image plane.

7. A projection optical apparatus as claimed in claim 4, wherein optical elements of the projection optical system, except for the aperture diaphragm, share a common optical axis.

8. A projection optical apparatus as claimed in claim 4, further comprising at least a first lens unit and a second lens unit,
    wherein said first lens unit and said second lens unit are arranged such that said first lens unit is decentered with respect to said second lens unit,
    wherein elements in said first lens unit share a first common optical axis, and
    wherein elements in said second lens unit share a second common optical axis.

9. A projection optical apparatus as claimed in claim 4, wherein a line perpendicular to a plane including the aperture diaphragm of the projection optical system is inclined, with respect to a line which is normal to the reduction-side image plane, toward a direction of a line connecting the center of the aperture diaphragm to a center of the reduction-side image plane.

10. A projection optical apparatus comprising a projection optical system for projecting an enlarged or reduced secondary image from a primary image,
    wherein a line connecting a center of an aperture diaphragm of the projection optical system to a center of an enlargement-side image plane forms a predetermined angle with respect to a line which is normal to the enlargement-side image plane,
    wherein the enlargement-side image plane and a reduction-side image plane are approximately parallel to each other, and
    wherein the projection optical system is composed of at least two centered lens units which are arranged decentered from one another.

11. A projection optical apparatus as claimed in claim 10, wherein a line perpendicular to a plane including the aperture diaphragm of the projection optical system is inclined, with respect to a line which is normal to the reduction-side image plane, toward a direction of a line connecting the center of the aperture diaphragm to a center of the reduction-side image plane.

12. A projection optical apparatus as claimed in claim 10, wherein the aperture diaphragm of the projection optical system is arranged on a plane perpendicular to a line connecting the center of the aperture diaphragm to a center of the reduction-side image plane.

13. A projection optical apparatus as claimed in claim 10, wherein the projection optical system and the aperture diaphragm are moved together as one unit in a direction parallel to a line connecting the center of the aperture diaphragm to a center of the reduction-side image plane in order to adjust a projection distance.

* * * * *